United States Patent
Kano et al.

(10) Patent No.: US 7,710,863 B2
(45) Date of Patent: May 4, 2010

(54) RELAY DEVICE

(75) Inventors: Shinya Kano, Kawasaki (JP); Keiji Miyazaki, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1031 days.

(21) Appl. No.: 11/223,973

(22) Filed: Sep. 13, 2005

(65) Prior Publication Data

US 2006/0198695 A1 Sep. 7, 2006

(30) Foreign Application Priority Data

Mar. 4, 2005 (JP) ............................. 2005-060916

(51) Int. Cl.
*G06F 11/00* (2006.01)
*G06F 15/173* (2006.01)
*H04L 12/26* (2006.01)

(52) U.S. Cl. .................. 370/217; 370/221; 370/237; 709/239

(58) Field of Classification Search ......... 370/216–228, 370/389–392, 395.1–395.43, 400–401, 229–238.1; 709/238–244
See application file for complete search history.

(56) References Cited

U.S. PATENT DOCUMENTS

| | | | |
|---|---|---|---|
| 6,785,436 B2 * | 8/2004 | Ravikanth et al. ............. | 385/16 |
| 6,862,288 B2 * | 3/2005 | Valoth et al. ................. | 370/403 |
| 7,039,005 B2 * | 5/2006 | Jenq et al. ................... | 370/217 |
| 7,218,606 B2 * | 5/2007 | Soumiya ...................... | 370/217 |
| 7,230,915 B2 * | 6/2007 | Kobayashi ................... | 370/226 |
| 2003/0067928 A1 * | 4/2003 | Gonda ......................... | 370/401 |
| 2004/0071080 A1 * | 4/2004 | Uchiyama et al. ............ | 370/225 |
| 2006/0056384 A1 * | 3/2006 | Ishii et al. .................... | 370/351 |

OTHER PUBLICATIONS

Pionturier, Yvan ("Link Failure Recovery for MPLS Networks with Multicasting", School of Engineering and Applied Science, University of Virginia, Aug. 2002, pp. 1-218).*
Generalized Multi-Protocol Label Switching (GMPLS) signaling Resource ReserVation Protocol-Traffic Engineering (RSVP-TE) Extensions [RFC3209]; L. Berger, Editor; Jan. 2003.
RSVP-TE: Extensions to RSVP for LSP Tunnels [RFC3209]; D. Awduche et al.; Dec. 2001.

* cited by examiner

*Primary Examiner*—Tri H Phan
(74) *Attorney, Agent, or Firm*—Fujitsu Patent Center

(57) ABSTRACT

To provide a device and a method enabling a user to judge which route a path used at the present traces without being aware of whether the now-in-use path is a working path or a recovery path. A relay device positioned at a diverging node between the working path and the recovery path, when forwarding a message (e.g., a Path message and a Resv message each containing RRO) used for route trace, judges which type of path the path employed for forwarding the data at the present is coincident with and forwards the data to the relay device disposed on the in-use path, thereby actualizing the trace of the route used for forwarding the data at the present.

10 Claims, 34 Drawing Sheets

RELAY DEVICE

BACKGROUND OF THE INVENTION

The present invention relates a technology effective in applying to a device employed in a network where a working path and a recovery path are established for recovery from a failure in a GMPLS/MPLS (Generalized Multi-Protocol Label Switching/Multi-Protocol Label Switching) network, and to a method executed on this device.

In recent years, GMPLS and MPLS have been focused on for the purpose such as providing traffic engineering to an IP network and providing a VPN (Virtual Private Network) service. The GMPLS and the MPLS are technologies for actualization of forwarding data on the basis of label information. The GMPLS and the MPLS, for actualizing this type of data forwarding, requires constructing a label table in each relay node (LSR: Label Switched Router) having a GMPLS function and a MPLS function. Therefore, the GMPLS and the MPLS use signaling protocols (CR-LDP (Constraint-based Label Distribution Protocol)/RSVP-TE (ReSerVation Protocol with Traffic Extension), etc.), wherein the label table is organized, and the path is established (refer to Non-Patent document 1). Further, the GMPLS and the MPLS enable the user to check which LSR the in-use path extends through by executing the route trace. Namely, the user can check which LSR the designated path runs through by designating the path.

By the way, in the recent years, on the occasion of building up the network, a working path and a recovery path are often provided for improving a fault tolerance. The GMPLS and the MPLS are applicable also to the network thus provided with the working path and the recovery path. Further, an extension of the RSVP-TE signaling protocol such as GMPLS Based Segment Recovery for establishing the working path and the recovery path, is proposed (refer to Non-Patent document 2). The GMPLS Based Segment Recovery is a technology of segmenting the working path into a plurality of segments and automatically or manually establishing the recovery path that bypasses the individual segments.

[Non-Patent document 1]D. Awduche, Movaz, L. Berger, D. Gan, et al.,"RSVP-TE: Extensions to RSVP for LSP Tunnels", Request for Comments: 3209

[Non-Patent document 2]Louis Berger, Igor Bryskin, Dimitri Papadimitriou, Adrian Farrel, "GMPLS Based Segment Recovery", Internet Draft Updates: 3473

In the conventional GMPLS and the MPLS, the working path and the recovery path are recognized respectively as independent paths. Hence, a user is able to check, on the occasion of executing the route trace, which LSR the working path extends through by designating the working path and also to check which LSR the recovery path extends through by designating the recovery path. The user was, however, required to explicitly designate the path in order to execute the route trace and was unable to designate a path employed in the network at the present. Namely, the user could not check which LSR the now-in-use path extends through, unless the user would explicitly designate the now-in-use path after judging whether the now-in-use path is the working path or the recovery path. Therefore, problems arose in a case where the user could not judge whether the now-in-use path is the working system or not and a case that the judgment requires a considerable length of time.

SUMMARY OF THE INVENTION

Such being the case, it is an object of the present invention, which solves these problems, to provide a device and a method enabling a user to judge which route a path used at the present traces without being aware of whether the now-in-use path is a working path or a recovery path. [Means for solving the Problems]

To solve the problems, a first mode of the present invention is a relay device in a network where there exist a plurality of paths each extending from an unspecified node to another node, path identifiers each uniquely specifying the path are assigned to one or more paths, and there are established a working path used for transferring data in a normal status and a recovery path used for transferring the data in a failure status (which is, in other words, a fault status) defined as a status in which a failure occurs in this working path, the relay device being installed in a diverging point (The diverging point corresponds to a parting according to the present invention) within the network in order to detect each of the nodes on the path used for transferring the data from the unspecified node to another node without depending on the path identifier, the relay device comprising receiving means, path judging means (The judging means corresponds to a determining means to the present invention), identifier assigning means (The identifier assigning means corresponds to an identifier adding means to the present invention) and transmitting means.

The receiving means receives a message used for detecting each of the nodes on the path. The message used for detecting each of the nodes on the path may be, for example, a message transferred by each of the relay devices included in the path when executing route trace based on a protocol such as GMPLS and MPLS. Specifically, the message may be, for instance, a Path message containing RRO and a Resv message containing the RRO.

The path judging means judges the path used for transferring the data at the present in the path specified by the path identifier assigned to the message or the other path corresponding to the path-identifier-specified path in the network.

The identifier assigning means assigns an identifier specifying a self-device to information contained in the message received by the receiving means. The identifier specifying the self-device may be an ID assigned to each of the relay devices, and may also be an address assigned to the self-device. Further, the information contained in the message is information containing at least the identifier specifying each of the relay devices that have relayed the message so far. The user can detect each of the nodes on the path by referring to the information contained in this message.

The transmitting means transfers information contained in the message received by the receiving means to the path judged by the path judging means.

According to the first mode of the thus-configured present invention, the relay device judges the now-in-use path, and the information contained in the message for the route trace is transferred to this path. Then, the transfer of the information contained in this message makes it possible to judge each of the relay devices included in the path used for transferring the data at the present. Therefore, the user has no necessity of judging which path, the working path or the recovery path, should be designated on the occasion of instructing the relay device to create and transmit the message for the route trace.

A second mode of the present invention is a relay device in a network where there exist a plurality of paths each extending from an unspecified node to another node, path identifiers each uniquely specifying the path are assigned to one or more paths, and there are established a working path used for transferring data in a normal status and a recovery path used for transferring the data in a failure status defined as a status in which a failure occurs in this working path, the relay device being installed in a diverging point within the network in order to detect each of the nodes on the path used for transferring the data from the unspecified node to another node without depending on the path identifier, the relay device comprising receiving means, path judging means, identifier assigning means and transmitting means.

The receiving means receives a message used for detecting each of the nodes on the path. The path judging means judges the path used for transferring the data at the present in the path specified by the path identifier assigned to the message or the other path corresponding to the path-identifier-specified path in the network, and determines to transfer, only when the in-use path is coincident with a path along which the message received by the receiving means is transmitted, information contained in this message to the coincident path.

The identifier assigning means assigns an identifier specifying a self-device to information contained in the message received by the receiving means. The transmitting means transfers information contained in the message received by the receiving means to the path judged by the path judging means.

According to the second mode of the thus-configured present invention, even when the data traffic is transmitted via both of the working path and the recovery path, the path judging means only the information contained in the message received from the path used for transferring the data at the present, is transferred to the next relay device. Therefore, as in the case of the first mode, the user has no necessity of judging which path, the working path or the recovery path, should be designated on the occasion of instructing the relay device to create and transmit the message for the route trace.

A third mode of the present invention is a route trace system comprising a first relay device and a second relay device. In a network where there exist a plurality of paths each extending from an unspecified node to another node, path identifiers each uniquely specifying the path are assigned to one or more paths, and there are established a working path used for transferring data in a normal status and a recovery path used for transferring the data in a failure status defined as a status in which a failure occurs in this working path, the first relay device is installed in a diverging point within the network in order to detect each of the nodes on the path used for transferring the data from the unspecified node to another node without depending on the path identifier. The first relay device includes receiving means, identifier assigning means and transmitting means.

The receiving means receives a message used for detecting each of the nodes on the path. The identifier assigning means assigns an identifier specifying a self-device to information contained in the message received by the receiving means. The transmitting means transfers information contained in the message received by the receiving means to both of the working path and the recovery path irrespective of whether the network status is a normal status or a failure status. Therefore, in the route trace system including the first relay device, the information contained in the message is transferred to both of the paths regardless of the network status at the diverging point between the working path and the recovery path.

The second relay device in the third mode can be configured by use of the relay device in the second mode of the present invention. In the route trace system in the third mode of the present invention, as described above, the first relay device transfers the information contained in the message to both of the working path and the recovery path, however, the second relay device at another diverging point (which is, in other words, a converging point) between the working path and the recovery path, judges which path the information is transferred to and whether this information is adopted or not.

A fourth mode of the present invention is a relay device in a network where there exist a plurality of paths each extending from an unspecified node to another node, and there are established a working path used for transferring data in a normal status and a recovery path used for transferring the data in a failure status defined as a status in which a failure occurs in this working path, the relay device being installed in an initial edge node on the recovery path in order to enable detection of each of the nodes included in the recovery path, the relay device comprising transmitting means, receiving means and determining means.

The transmitting means transmits, to the recovery path, a message used for detecting each of nodes on the recovery path. The receiving means receives another message sent back from another relay device with respect to the message transmitted by the transmitting means.

The determining means stores that a self-device is in a waiting-for-message status when the transmitting means transmits the message used for detecting each of the nodes included in the recovery path, and determines not to transfer another message to another relay device when stored with being in the waiting-for-message status when the receiving means receives another message.

According to the fourth mode of the thus-configured present invention, even when sending the message for the route trace from the present relay device installed midways of the path used for transferring the data at the present, another message sent back with respect to this message is prevented from being transferred over the present relay device further to another relay device (the relay device on an upstream side). Therefore, even when the message for tracing the route of the recovery path is sent from the present relay device installed midways of the path used for transferring the data, the present relay device can acquire a result of the trace.

A fifth mode of the present invention is a relay device in a network where there exist a plurality of paths each extending from an unspecified node to another node, and there are established a working path used for transferring data in a normal status and a recovery path used for transferring the data in a failure status defined as a status in which a failure occurs in this working path, the relay device being installed in an initial edge node on the recovery path in order to enable detection of each of the nodes included in the recovery path, the relay device comprising transmitting means, receiving means, judging means and detecting means.

The transmitting means transmits, to the recovery path, a message used for detecting each of nodes on the recovery path. The receiving means receives another message sent back from another relay device with respect to the message transmitted by the transmitting means and containing an identifier of another relay device and identifiers of respective relay devices existing on the recovery path between another relay device and the present relay device.

The judging means judges an end node on the recovery path. The detecting means detects the identifiers of the respective relay devices included in the recovery path by eliminating identifiers of the respective relay devices which exists in the opposite side of a present relay device on the basis of end node judged by the judging unit from identifiers of the respective relay devices that are contained in the other message received.

With this configuration, for example, even when the message for tracing the route of the recovery path is transferred over the relay device installed in an end node on the recovery path to the relay device installed on another farther path, the identifiers specifying unnecessary relay devices are eliminated by the detecting means. This enables accurate acquirement of each of the relay devices included in the recovery path.

The first through fifth modes may be actualized in a way that executes a program by an information processing device (relay device). Namely, the present invention can be specified as a program for making the information processing device (relay device) execute processes executed by the respective means in the first trough fifth modes described above or as a recording medium recorded with this program. Moreover, the present invention may also be specified as a method by which the information processing device (relay device) executes the processes executed by the respective means given above.

[Effects of the invention]

According to the present invention, the user has no necessity of judging which path, the working path or the recovery path, should be designated on the occasion of instructing the relay device to create and transmit the message for the route trace.

DETAILED DESCRIPTION OF THE INVENTION

<Principle>

Before explaining a relay device according to the present invention, to begin with, each of MPLS, GMPLS, RSVP-TE, RRO and GMPLS Based Segment Recovery will be described.

<MPLS>

Figure 1:
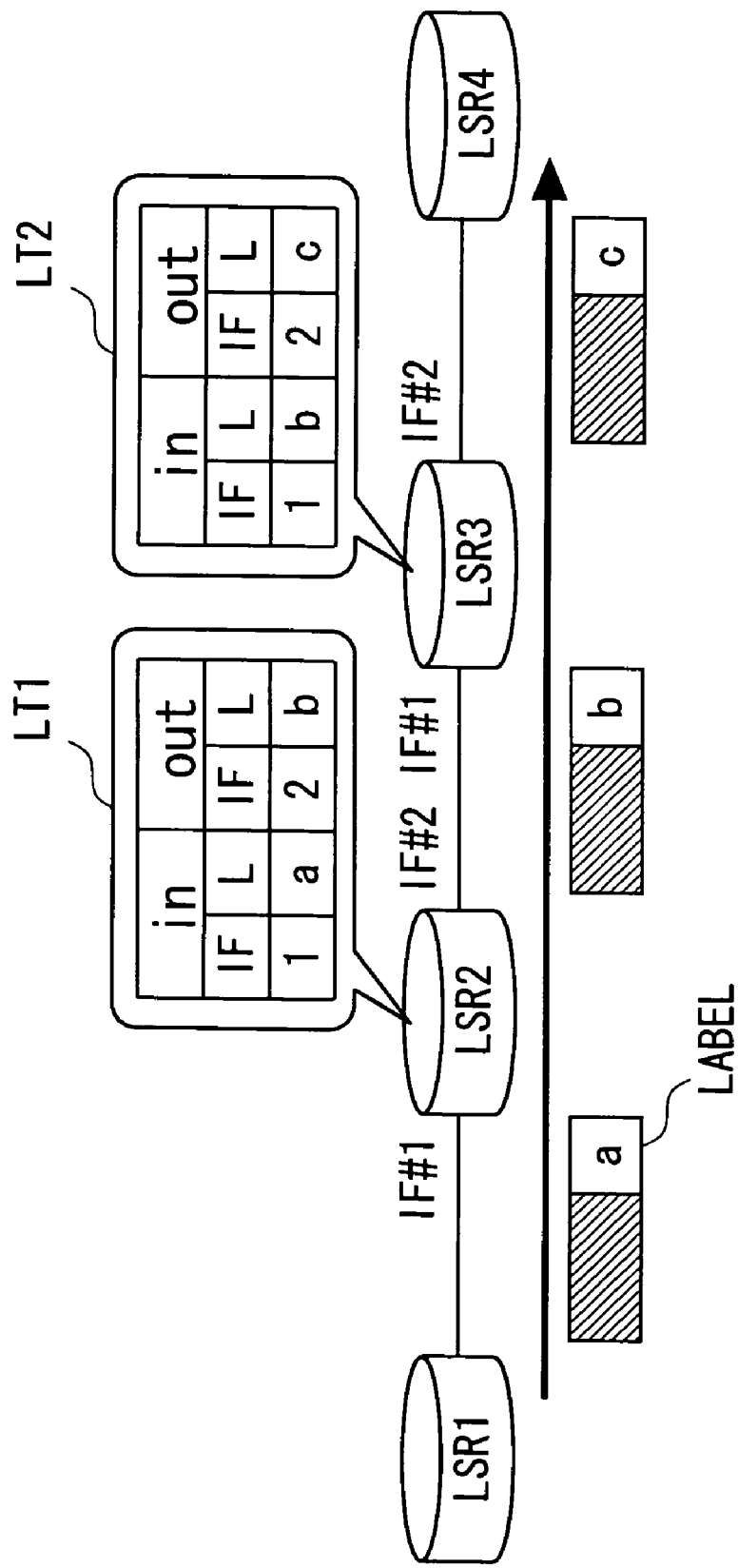
FIG. 1 is a diagram showing an example of MPLS-based data transfer.

MPLS is a technology for forwarding data in accordance with label information. FIG. 1 is an explanatory diagram of the MPLS. Hereinafter, the MPLS will be explained with reference to FIG. 1. FIG. 1 illustrates a network in which a plurality of LSRs (Label Switching Routers) (LSR 1-LSR 4) are connected in series, and data are forwarded from the LSR 1 to the LSR 4 via the LSRs 2 and 3.

The label information is expressed by a fixed-length label attached to the head of a packet. In FIG. 1, hatching areas of packets depicted in a rectangular shape represent real data (containing other protocol headers) to be forwarded, and labels (a, b, c) are attached to the heads thereof. In the MPLS, the LSR stores an unillustrated storage device with label tables (e.g., LT 1, LT 2) used for packet routing. The label table shows a relationship between an input label (IN: L), an input interface (IN: IF) and an output label (OUT: L), an output interface (OUT: IF).

Each LSR determines a routing destination according to not an address contained in the packet but the label attached to the packet. To be specific, the LSR refers to an input interface and an input label on the occasion that a processing target packet is inputted, and determines an output interface and an output label that are so stored as to be associated with the input interface and the input label in the label table. Then, the LSR rewrites the label attached to the packet with the thus-determined output label, and relays this packet via the determined output interface.

With a repetition of such a process, the packet is transmitted from a source to a destination. Note that the LSR at a start of an MPLS network is particularly called a LER (Label Edge Router) and attaches, for the first time, the label to the packet inputted to the MPLS network.

Next, the packet routing from the LSR 1 to the LSR 4 will be specifically described with reference to FIG. 1. To start with, the LSR 1 attaches the label a to the packet and transmits the label-attached packet to the LSR 2. The LSR 2, when receiving the packet assigned the label a from the first interface (IF #1), searches through the label table LT 1 and thus acquires an output interface (a second interface: IF #2) and an output label (b). Then, the LSR 2 rewrites the label a of the inputted packet into the label b, and outputs this packet to a second interface. The same process as this process is executed also by the LSR 3, and the packet is forwarded to the end LSR 4 (end node). The MPLS actualizes the forwarding based on the fixed-length label as described above and is therefore capable of scheming to speeding up the packet routing.

In the MPLS, the LSR retains each label in a way that associates the label with band control, whereby a band for each packet flow can be assured.

<GMPLS>

The GMPLS involves using, as the label information, not only the fixed-length label but also a timeslot for time-division transmission and an optical wavelength in optical multiplex transmission. For example, in the case of employing the optical wavelength as the label information, there is no necessity of converting an optical signal into an electric signal. Hence, the GMPLS can actualize a much higher-speed forwarding process.

In the time-division transmission, each of the LSRs retains a label table showing a relationship between an input timeslot, an input interface and an output timeslot, an output interface. Then, each LSR determines the output interface and the output timeslot in accordance with the input interface and the input timeslot, and outputs the packet under the thus-determined condition. With a repetition of this process, the packet is forwarded to the destination from the source.

In the optical multiplex transmission, each node retains a label table showing a relationship between an input optical wavelength, an input interface and an output optical wavelength, an output interface. Then, each LSR determines the output interface and the output optical wavelength in accordance with the input interface and the input optical wavelength, converts the input optical wavelength into the output optical wavelength, and outputs the output optical wavelength to the output interface. With a repetition of this process, the data is transmitted to the destination from the source.

<RSVP-TE>

As described above, the GMPLS and the MPLS require establishing the path by constructing the label table in each LSR. On the occasion of establishing the path by constructing the label table, a signaling protocol for establishing the path is employed. The following description will deal with RSVP-TE (ReSerVation Protocol with Traffic Engineering) as a specific example of the signal protocol for establishing the path as described above.

Figure 2:
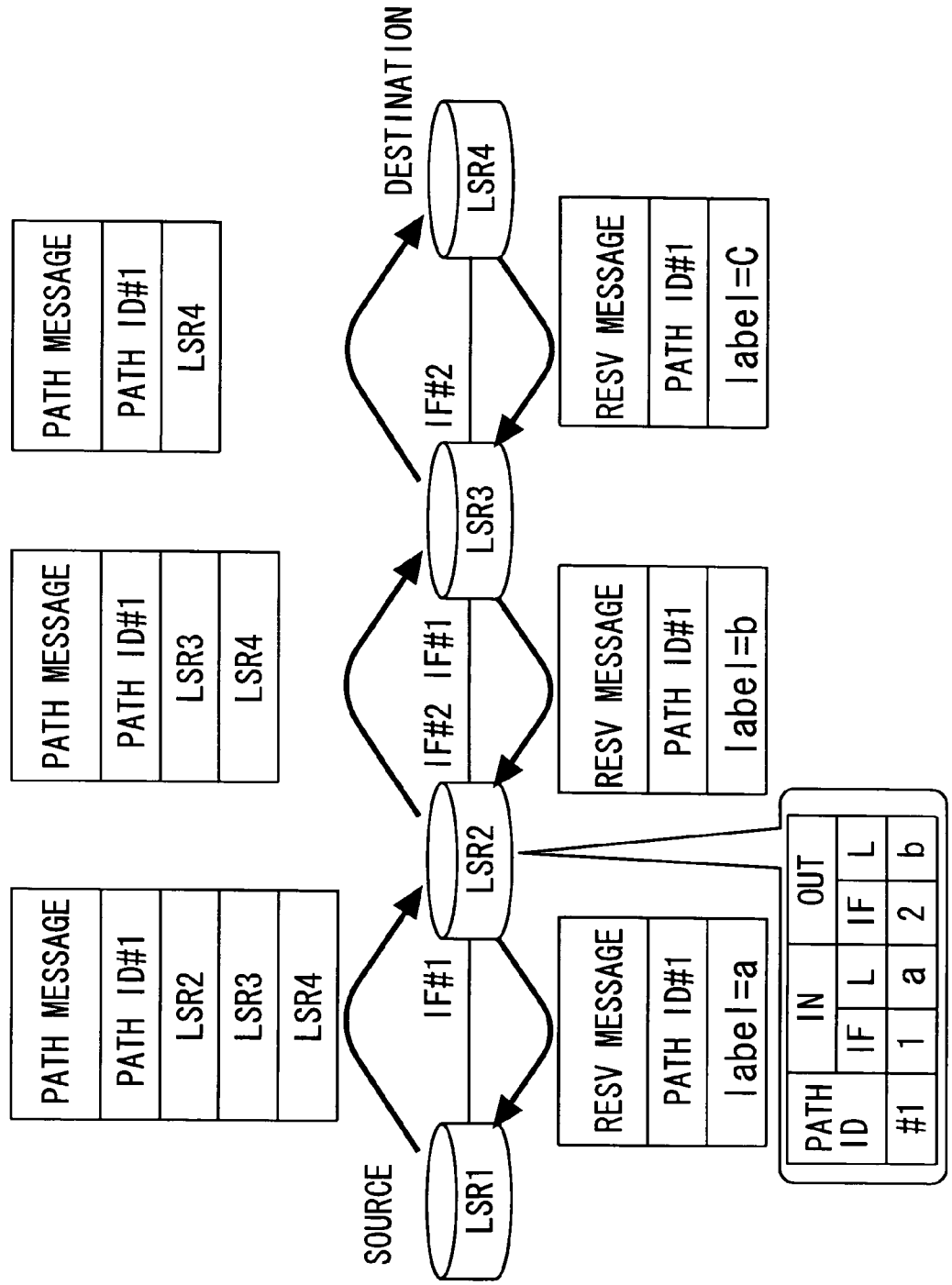
FIG. 2 is a diagram showing an example of establishing a path based on RSVP-TE.

FIG. 2 is a diagram showing an example of operation for establishing the path by constructing the label table based on the RSVP-TE. The initial edge node (start node) (LSR 1) making a request for establishing the path sends a path establishing request message (Path message) hop by hop (Hop-By-Hop) to an end node (LSR 4) of the path. In this example, a path configuration is explicitly designated, and hence pieces of information of the LSRs as via-routers are contained in the Path message. The end node receiving the Path message sends a path establishing response message (Resv message) for assigning the labels to the start node. At this time, the end node sends the Resv message back to the start node along the same route as the route via which the Path message was sent. Hereat, the label table in each LSR is constructed by registering the labels stored in the Resv message in the label tables in each LSR. Each of the Path message and the Resv message is stored with a path ID. Each of the label tables is registered with this path ID together.

Figure 3:
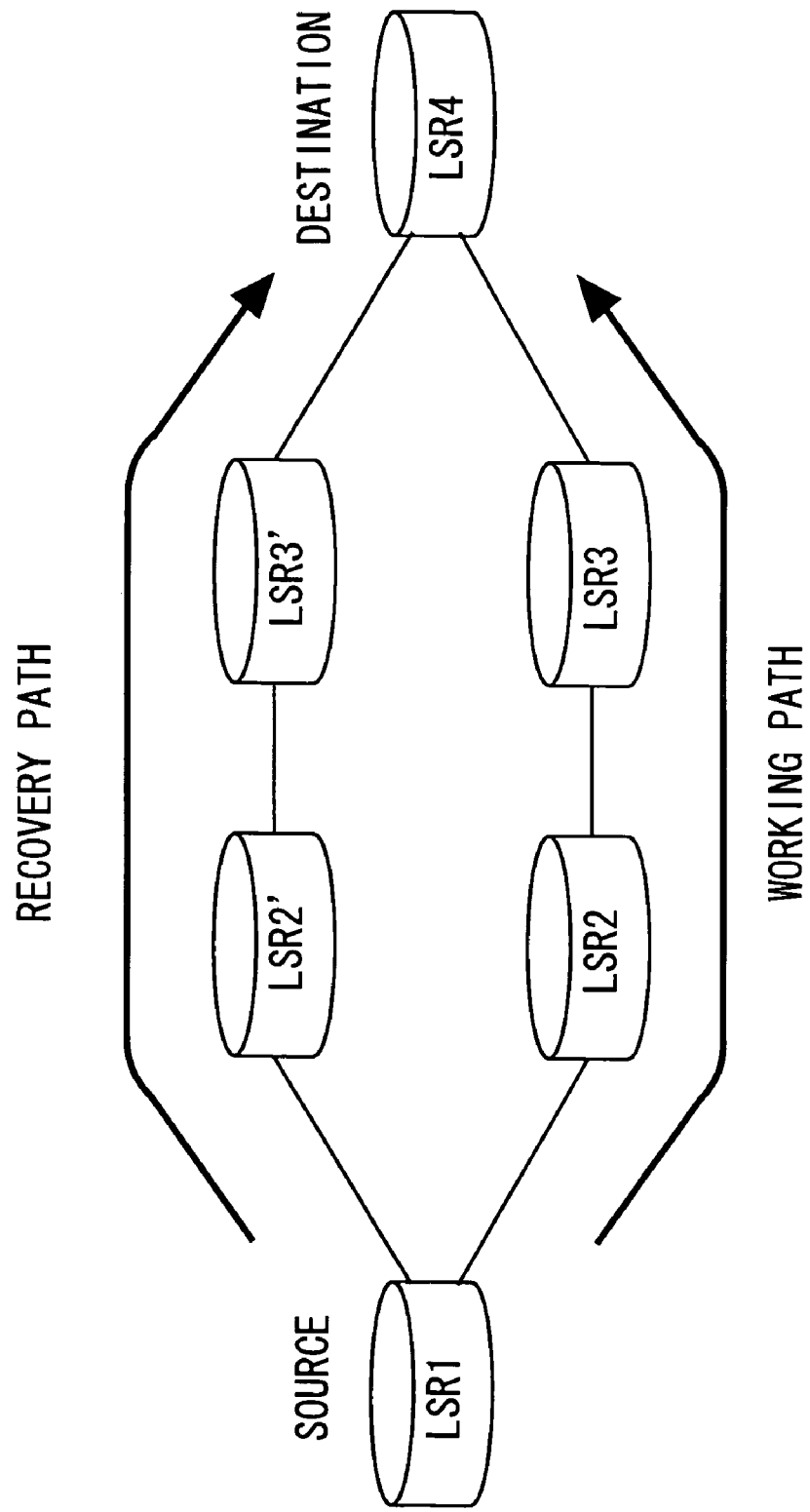
FIG. 3 is a diagram showing an example of a network architecture using a recovery path.

Given next is a description of an operational example when establishing a recovery path based on the RSVP-TE. FIG. 3 is a diagram showing a configuration of the recovery path that is presumed in the following description. The description will be made by exemplifying a case of establishing the recovery path (LSR 1, LSR 2', LSR 3', LSR 4), for the working path (LSR 1, LSR 2, LSR 3, LSR 4) established in the description given above, including the same end node and the same start node.

Figure 4:
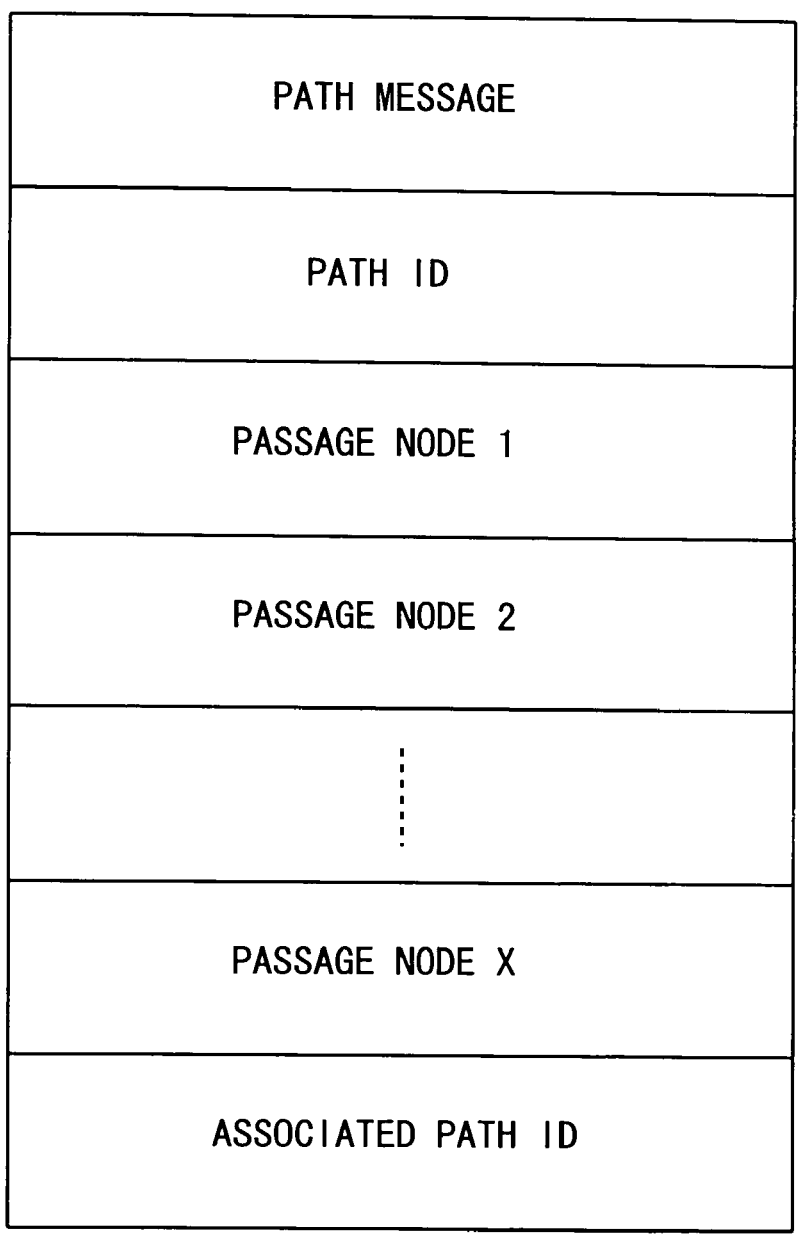
FIG. 4 is a diagram showing an example of a format of a Path message.

FIG. 4 is a diagram showing a format of a Path message used when establishing the recovery path. The Path message used when establishing the recovery path is, as compared with the Path message employed when establishing the working path, different in terms of assigning a corresponding path ID. The path ID of the Path message used when establishing the recovery path is assigned a path ID specifying the recovery path. Then, the corresponding path ID is assigned a path ID specifying the working path corresponding to the recovery path to be established.

Figure 5:
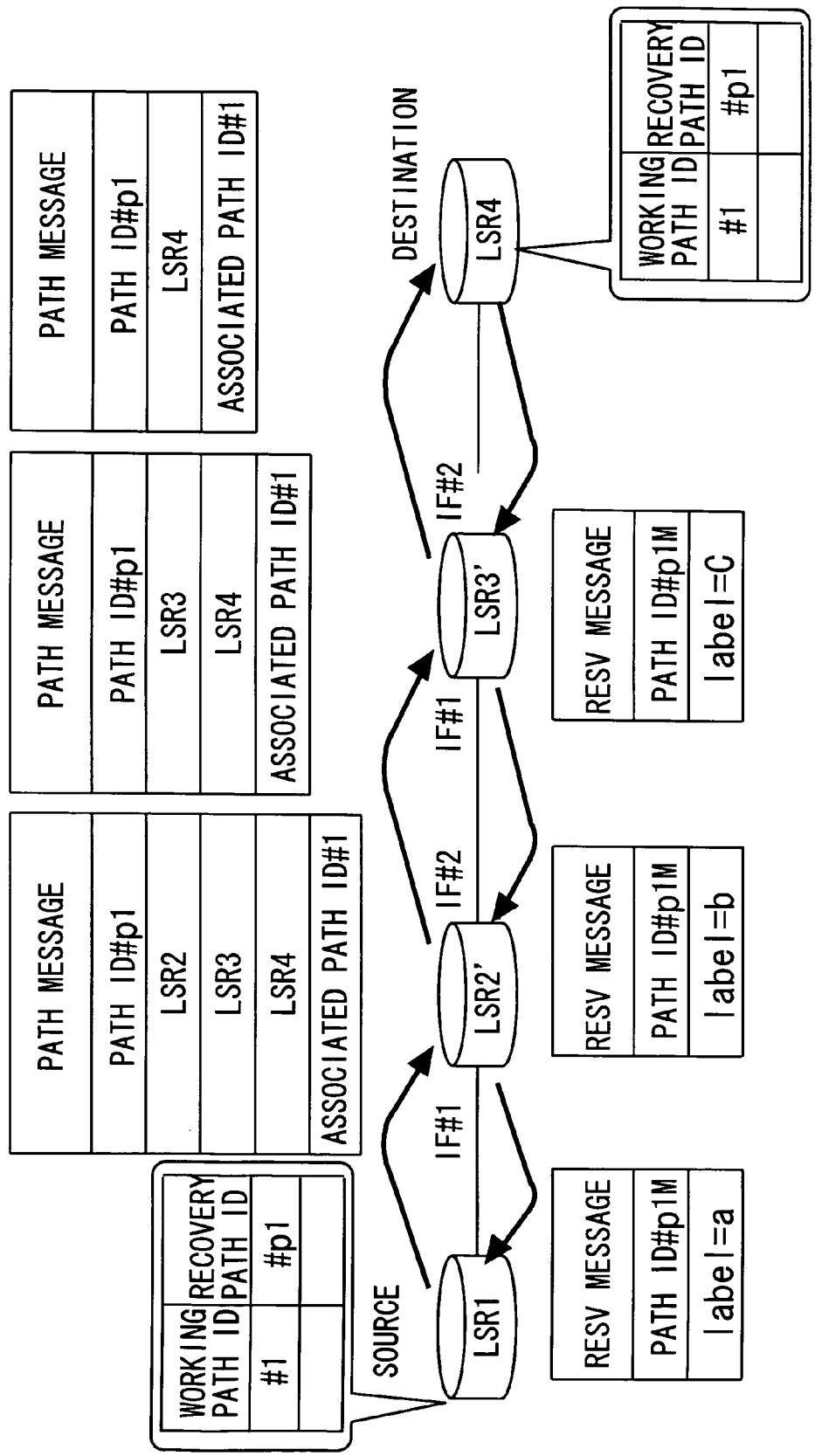
FIG. 5 is a diagram showing an example of establishing a recovery path based on RSVP-TE.

FIG. 5 is a diagram showing an operational example when establishing the recovery path shown in FIG. 3. The operation in this case is also basically the same as when establishing the working path shown in FIG. 2. A difference is, however, such that the Path message forwarded from the start node (LSR 1) to the end node (LSR 4) contains the corresponding path ID as shown in FIG. 4. The case in FIG. 5 is that the working path ID (#1) shown in FIG. 2 is assigned as the corresponding path ID. Another difference is that each of the start node (LSR 1) and the end node (LSR 4) retains a working path/recovery path mapping table. The working path/recovery path mapping table is a table stored with the path ID of the working path and the path ID of the recovery path corresponding to the working path in a way that makes the working path ID and the recovery path ID corresponding to each other. In the case in FIG. 5, a path ID "#1" of the working path and a path ID "#p1" of the recovery path are so stored as to be corresponding to each other in the table. Unillustrated storage devices of the LSR 1 and the LSR 4 are stored with this table.

<RRO>

The signaling protocol for establishing the path involves using the Path message indicating a request for establishing the path and a Resv message as a response to this request. RRO (Record Route Object) is inserted into these message, thereby making it possible to check which LSR the in-use path extends via. This process is referred to as a route trace. Execution of the route trace enables a user to confirm that the path is correctly established.

Figure 6:
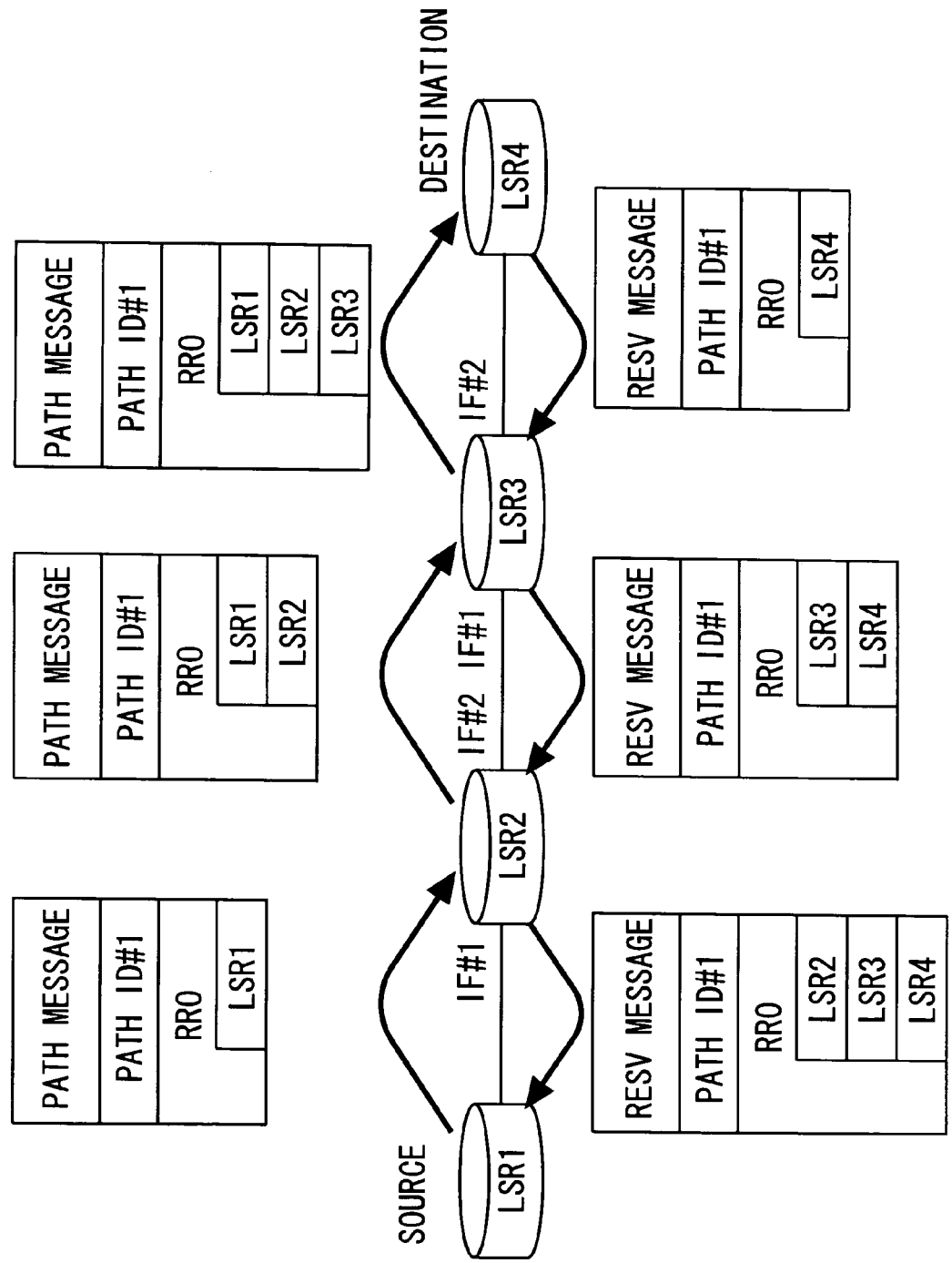
FIG. 6 is a diagram showing an example of route trace using RRO.

Next, a flow of a specific process of the route trace will be explained. FIG. 6 is a diagram showing a processing example of the route trace. The user executes the process, wherein the LSR starting the route trace is set as an end node. At first, the Path message is sent downstream of the path from the end node (LSR 1). This Path message contains the RRO stored with a self-address of the LSR 1. The nodes (LSR 2, LSR 3) receiving the Path message containing the RRO add self-addresses to the received Path message, and forward the address-added Path message to the downstream nodes.

The end node (LSR 4) receiving the Path message containing the RRO can confirm all the nodes on this path by referring to a list of the address contained in the RROs (which will hereinafter be called an address list). Then, the end node (LSR 4) sends the Resv message containing the RRO back to the upstream side according to the received Path message containing the RRO. This Resv message contains the RRO stored with the address of the end node itself. The nodes (LSR 2, LSR 3) receiving the Resv message containing the RRO forward the received Resv message containing the RRO to the upstream nodes on the path. At this time, each relay node newly adds the address of the node itself to the RRO of the Resv message to be forwarded.

The start node (LSR 1) receiving the Resv message containing the RRO can confirm all the nodes on this path by referring to the address list in the RRO. Therefore, the user is able to check whether proper setting is done or not in comparison with the path designated at the establishing request time by referring to this address list.

<GMPLS Based Segment Recovery>

The IETF proposes an extension of RSVP-TE signaling protocol in order to establish the working path and the recovery path. This proposal is GMPLS Based Segment Recovery (which will hereinafter be abbreviated to GMPLS-BSR). The GMPLS-BSR is a method of segmenting the working path into a plurality of segments and automatically or manually establishing the recovery path bypassing the individual segment. Added as objects of the RSVP-TE signaling according to the GMPLS-BSR are pieces of information such as information for specifying the segment, route information of the recovery path, a protection attribute, and information that makes the working path and the recovery path corresponding to each other.

Figure 7:
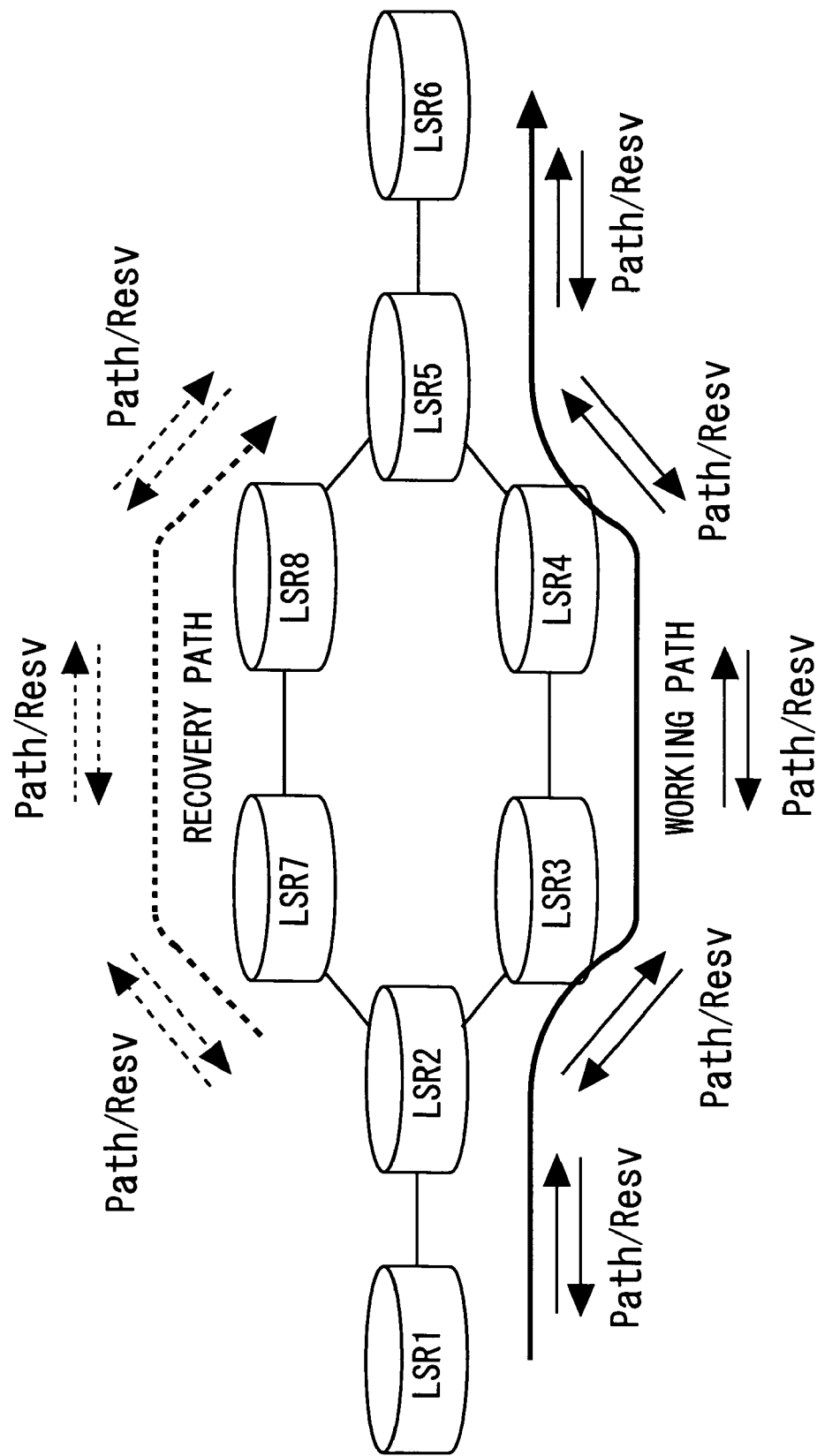
FIG. 7 is a diagram showing GMPLS-BSR.

FIG. 7 is a diagram showing a specific example of the GMPLS-BSR. To start with, the start node (LSR 1) of the working path sends the Path message to the end node (LSR 6) via the working path (LSR 2, LSR 3. LSR 4, LSR 5). The end node (LSR 6), upon receiving this Path message, sends the Resv message back in the reversed direction on the same path. This operation is the same as by establishing the RSVP-TE signaling based path. At this time, however, the start node of the segment newly generates a Path message for establishing the recovery path on the basis of the information added afresh. The case in FIG. 5 is that the start node (LSR 2) of the recovery path sends the Path message to the end node (LSR 5) along a route (LSR 2, LSR 7, LSR 8, LSR 5) of the recovery path. This Path message receives additions as new pieces of information such as the start node of the recovery path, the end node of the recovery path, relay nodes of the recovery path and a protection type (e.g., 1: 1 protection).

The start node (LSR 2) that establishes the recovery path sends the Path message stored with a path ID of the corresponding working path, a protection type, a route (the start node, the relay nodes, the end node) of the recovery path and a path ID of the recovery path to the LSR 5 via the LSR 7 and the LSR 8. The LSR 5, when receiving this Path message, sends the Resv message in the reversed direction on the same path. Then, each of the start and end nodes of the recovery path has its own mapping table stored with a mapping relation between the working path and the recovery path. Each of the start and end nodes of the recovery path, when a failure occurs, changes the path at a high speed on the basis of this mapping table.

First Embodiment

Next, an example of a configuration of a relay device 1*a* defined as a first embodiment of a relay device according to the present invention and an example of an operation of a network employing the relay device 1*a*, will be described.

<Configuration of Device>

The relay device 1*a* includes hardwarewise a CPU (Central Processing Unit), a main storage device (RAM), an auxiliary storage device, etc., which are connected via a bus. The auxiliary storage device is constructed by use of a nonvolatile storage device. The nonvolatile storage device connoted herein represents, a so-called ROM (Read-Only Memory: E P R O M (Erasable Programmable Read-Only Memory), an EEPROM (Electrically Erasable Programmable Read-Only Memory), including a mask ROM etc.), an FRAM (Ferroelectric RAM), a hard disc and so on.

Figure 8:
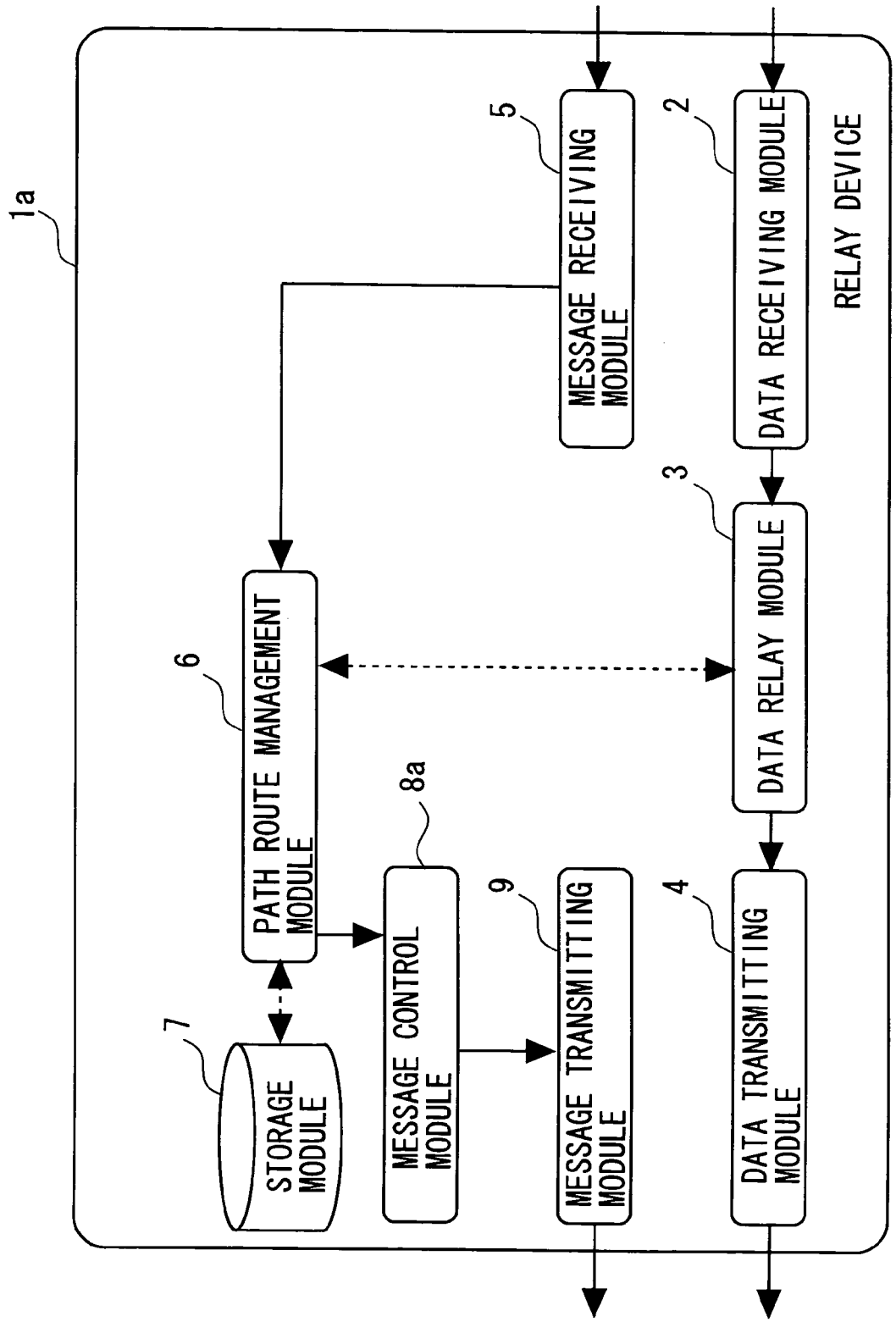
FIG. 8 is a diagram showing an example of functional blocks in a first embodiment.

FIG. 8 is a diagram showing an example of a functional block of the relay device 1*a*. The relay device 1*a*, when a variety of programs (OS, application, etc.) stored on the auxiliary storage device are loaded into the main storage device and executed by the CPU, functions as a device including a data receiving module 2, a data relay module 3, a data transmitting module 4, a message receiving module 5, a path route management module 6, a storage module 7, a message control module 8*a*, a message sending module 9, etc. The data relay module 3, the path route management module 6 and the message control module 8*a* are actualized by the CPU's executing the programs. Further, the data receiving module 2, the data relay module 3, the data transmitting module 4, the message receiving module 5, the path route management module 6, the message control module 8*a* and the message sending module 9 may also be configured as dedicated chips. Next, the respective functional modules included in the relay device 1*a* will be explained.

<Data Receiving Module>

The data receiving module 2 receives the data transmitted (forwarded) to the self-device 1*a* via the network. The data receiving module 2 transfers the received data to the data relay module 3. Note that the description will be given in a way that separates the real data transmitted based on the GMPLS and the MPLS, and the Path message and the Resv message employed for the route trace in the following description. Accordingly, the data received by the data receiving module 2 is the real data but is neither the Path message nor the Resv message.

<Data Relay Module>

The data relay module 3 determines a forwarding destination of the data received by the data receiving module 2. The data relay module 3 determines, based on the label assigned to the received data, a proper output interface according to rules of the GMPLS and of the MPLS. Then, the data relay module 3 relays (switching) the data to the thus-determined output interface. Further, the data relay module 3 executes also a process such as rewriting the label according to the rules of the GMPLS and the MPLS.

<Data Transmitting Module>

The data transmitting module 4 transmits, to the network, the data for which the output interface is determined by the data relay module 3.

<Message Receiving Module>

The message receiving module 5 receives the message (the Path message or the Resv message) sent (forwarded) to the self-device 1*a* via the network. The message receiving module 5 transfers the received message to the path route management module 6.

<Path Route Management Module>

The path route management module 6 judges whether data traffic about the path specified by the path ID contained in the received message is in a normal status or in a failure status. The normal status is a status in which any failure does not occur on that path, and the working path is employed for forwarding the data. The failure status is a status in which a failure occurs on that path, and the recovery path is used for forwarding the data. This judgment can be made by referring to switch setting of the hardware or by referring to a route management table.

An in-depth explanation of this point will be given as below. Route switching from the working path to the recovery path when the failure occurs and the route switching from the recovery path to the working path when recovered from the failure, are actualized by any one of the following two methods. The first method is a method of changing the switch setting of the hardware by signaling. The second method is a method by which the route switching is conducted hardware-wise autonomously by use of APS (Automatic Protection Switching) of a SONET/SDH (Synchronous Optical Network/Synchronous Digital Hierarchy) based mechanism. Therefore, the path route management module 6 can take the two methods in order to know which status, the normal status or the failure status, the network is in.

The first method is a method of checking the path route management table and thus judging whether in the normal status or in the failure status. When the hardware setting is changed by signaling and when the route is autonomously switched hardwarewise, the hardware notifies a signaling process of the route switching. In this case, the signaling process registers information about whether in the normal status or in the failure status in the path route management table. Hence, the first method can be actualized.

The second method is a method of checking whether the forwarding data is transmitted to the recovery path or received from the recovery path by checking a status of the switch setting of the hardware, and thus judging whether in the normal status or in the failure status.

Then, the path route management module 6, when installed at a diverging point or a converging point of the working path and the recovery path, judges which path the received message should be forwarded from or which path the message should be forwarded to.

<Storage Module>

The storage module 7 may be structured by employing either a so-called nonvolatile storage device or a so-called volatile storage device. The storage module 7 is stored with using conditions of the working path and of the recovery path. When establishing the path and when switching the route against the failure, if the hardware setting is changed by signaling, the storage module 7 is registered with information about whether in the normal status or in the failure status. Further, the hardware autonomously switches the route due to the failure status or for other reasons, and the hardware notifies the path route management module 6 of the route switching, in which case also this status is registered in the storage module 7.

<Message Control Module>

The message control module 8a updates the received message or creates a new message. The message control module 8a, in the case of updating the received message, adds a self address and a path ID of a proper path to the received message. Further, the message control module 8a, in the case of creating the new message, sets a path route trace flag in the message, and adds the self-device address and a path ID specifying the route trace target path to the message.

<Message Transmitting Module>

The message transmitting module 9 sends the message updated by the message control module 8a or the created message to the route (the working path or the recovery path) judged by the path route management module 6. Note that the path message transmitting module 9, when sending the updated message, transmits the message downstream in the case of receiving the message from the upstream side and transmits the message upstream in the case of receiving the message from the downstream side.

<Operational Example of Relay Device>

Figure 9:
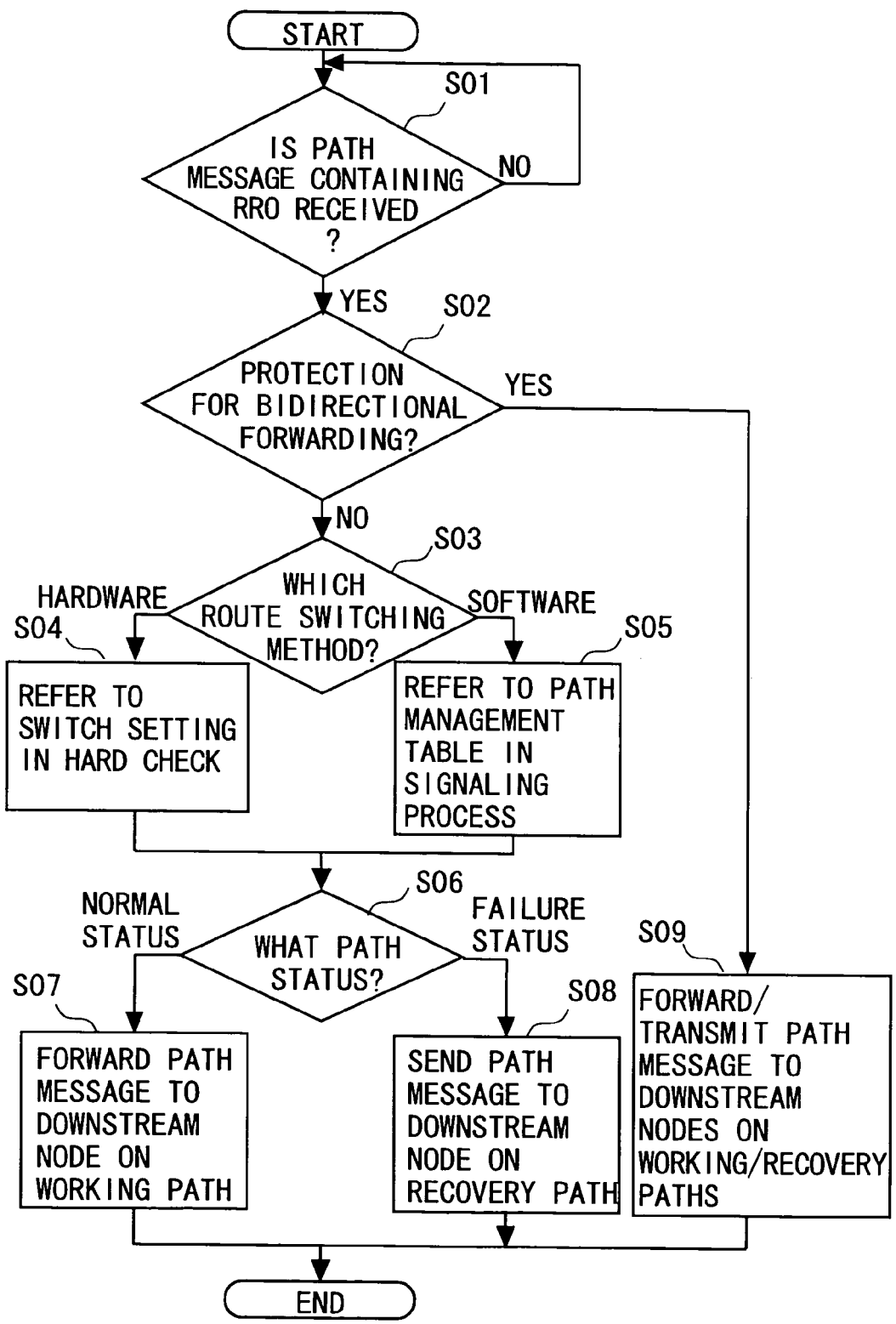
FIG. 9 is a flowchart showing an operational example of a relay device installed at a diverging point.

Next, an example of a device operation of the relay device 1a configured as described above, will be explained. FIG. 9 is a flowchart showing the operational example when the relay device 1a installed at the diverging point (LSR 2 in FIG. 7) receives the Path message. To begin with, the operational example when the relay device 1a installed at the diverging point receives the Path message will be described.

When the message receiving module 5 receives the Path message (S01-YES), the path route management module 6 judges whether or not protection of the path specified by the path ID contained in the Path message is protection (e.g., 1+1 protection: this 1+1 protection will be stated later on) that forwards the data to both of the working path and the recovery path. In the case of the protection for the bidirectional path (S02-YES), the path route management module 6 determines to transmit the received Path message to the working path and to further transmit the newly created Path message to the recovery path. The message control module 8a adds the RRO stored in the received Path message to these two Path messages. At this time, the message control module 8a adds the address of the self-device 1a to the RRO to be added. Then, the message transmitting module 9 sends these two Path messages in accordance with the determination made by the path route management module 6 (S09).

While on the other hand, if the protection is not the protection for the bidirectional path (S02-NO), the path route management module 6 judges whether the route switching between the working path and the recovery path is conducted autonomously by the hardware or controlled by the software. In the case of the hardwarewise-conducted route switching (S03-hardware), the path route management module 6 checks whether in the normal status or in the failure status by referring to the switch setting in hard check (S04). On the other hand, in the case of the softwarewise-controlled route switching (S03-software), the path route management module 6 judges whether in the normal status or in the failure status by referring to the path management table within the signaling process (S05).

Next, the path route management module 6 judges which route becomes a forwarding destination of the Path message. If the path status is the normal status (S06-normal status), the path route management module 6 determines to forward the received Path message to the working path. Then, the message control module 8a adds the address of the self-device 1a to the RRO of the Path message, and the message transmitting module 9 sends this Path message according to the determination made by the path route management module 6 (S07). If the path status is the failure status (S06-failure status), the path route management module 6 newly creates the Path message and determines to send this message to the recovery path. The message control unit 8a adds the RRO of the received Path message to the newly created Path message. At this time, the message control module 8a adds the address of the self-device 1a to the RRO to be added. Then, the message transmitting module 9 sends this Path message according to the determination made by the path route management module 6 (S08).

Figure 10:
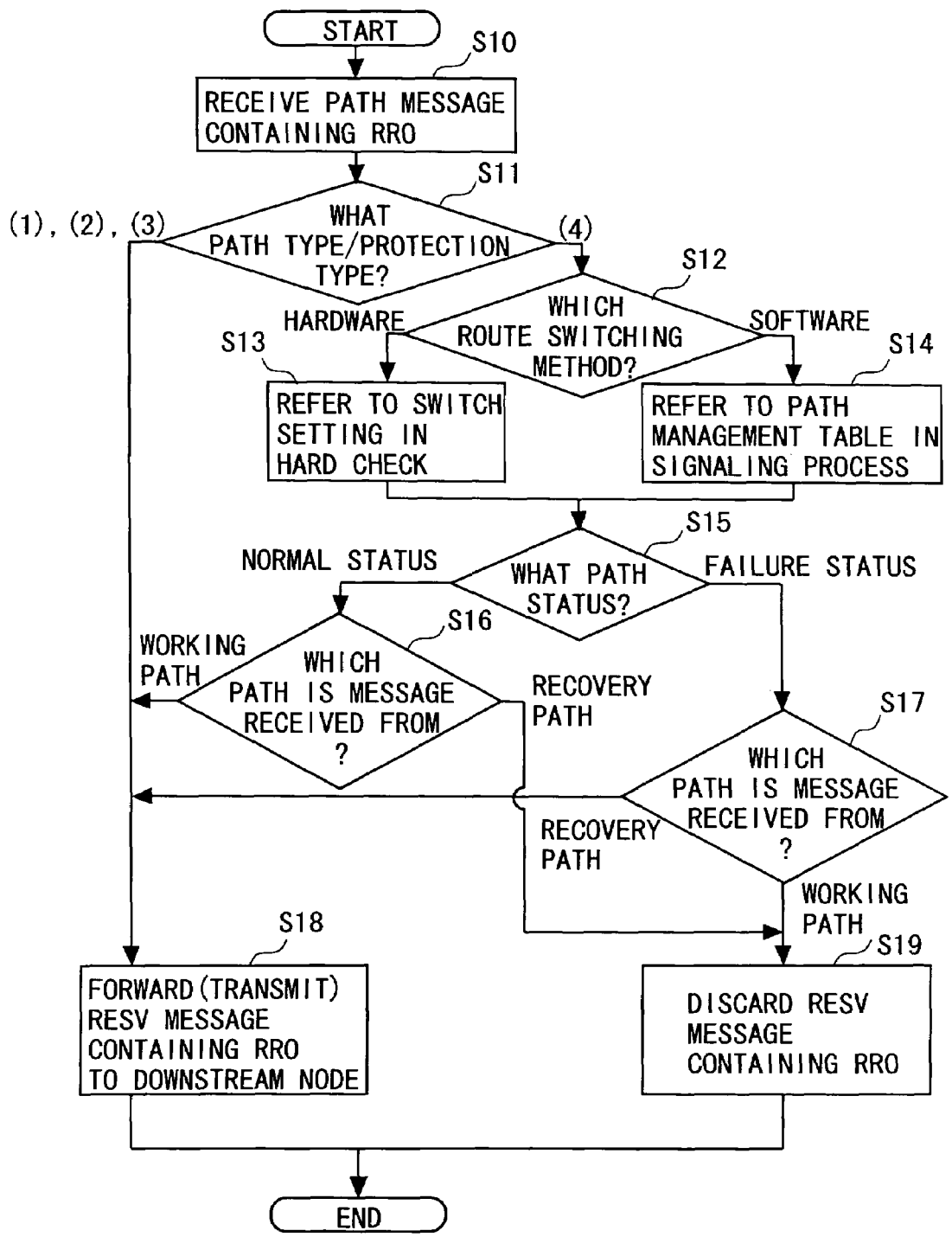
FIG. 10 is a flowchart showing an operational example of the relay device installed at the diverging point.

FIG. 10 is a flowchart showing an operational example when the relay device 1a installed at the diverging point receives the Resv message. Given next is an explanation about the operational example when the relay device 1a installed at the diverging point receives the Resv message.

At first, the message receiving module 5 receives the Resv message containing the RRO (S10). Next, the path route management module 6 judges a type of the path and a type of the protection (S11). When corresponding to any one of a case (1) of a unidirectional path, a case (2) of the route switching in forward-direction linkage or backward-direction linkage, and a case (3) of asynchronous route switching in the forward direction or the backward direction and of not being the protection that forwards the data to both of the working path and the recovery path, the path route management module 6 determines to forward the Resv message to the working path. Then, the message control module 8a adds the address of the self-device 1a to the RRO of the Resv message, and the message transmitting module 9 sends this Resv message according to the determination made by the path route management module 6 (S18).

On the other hand, in a case (4) of the asynchronous route switching in the forward direction or the backward direction and of being the protection that forwards the data to both of the working path and the recovery path, the path route management module 6 judges whether the route switching between the working path and the recovery path is autonomously conducted by the hardware or controlled by the software. In the case of the hardwarewise-conducted route switching (S12-hardware), the path route management module 6 refers to the switch setting in the hardware check and thus checks whether in the normal status or in the failure status (S13). While on the other hand, in the case of the softwarewise-controlled route switching (S12-software), the path route management module 6 refers to the path management table in the signaling process, thereby judging whether in the normal status or in the failure status (S14).

Next, the path route management module 6 judges a route serving as a Resv message forwarding destination. If the path status is the normal status (S15-normal status) and if the processing target Resv message is received from the working path (S16-working path), the path route management module 6 determines to forward the Resv message to the working path. Then, the message control module 8a adds the address of the self-device 1a to the RRO of the Resv message, and the message transmitting module 9 sends this Resv message according to the determination made by the path route management module 6 (S18). If the path status is the normal status (S15-normal status) and if the processing target Resv message is received from the recovery path (S16-recovery path), the path route management module 6 determines to discard the received Resv message (S19). In this case, the message control module 8a and the message transmitting module 9 execute neither the updating process nor the transmitting process.

If the path status is the failure status (S15-failure status) and if the processing target Resv message is received from the recovery path (S17-recovery path), the path route management module 6 creates a Resv message afresh and determines to send the message to the working path. The message control module 8a adds the RRO of the received Resv message to the newly created Resv message. At this time, the message control module 8a adds the address of the self-address 1a to the RRO to be added. Then, the message transmitting module 9 sends this Resv message according to the determination made by the path route management module 6 (S18). If the path status is the failure status (S15-failure status) and if the processing target Resv message is received from the working path (S17-working path), the path route management module 6 determines to discard the received Resv message (S19). In this case, the message control module 8a and the message transmitting module 9 execute neither the updating process nor the transmitting process.

Figure 11:
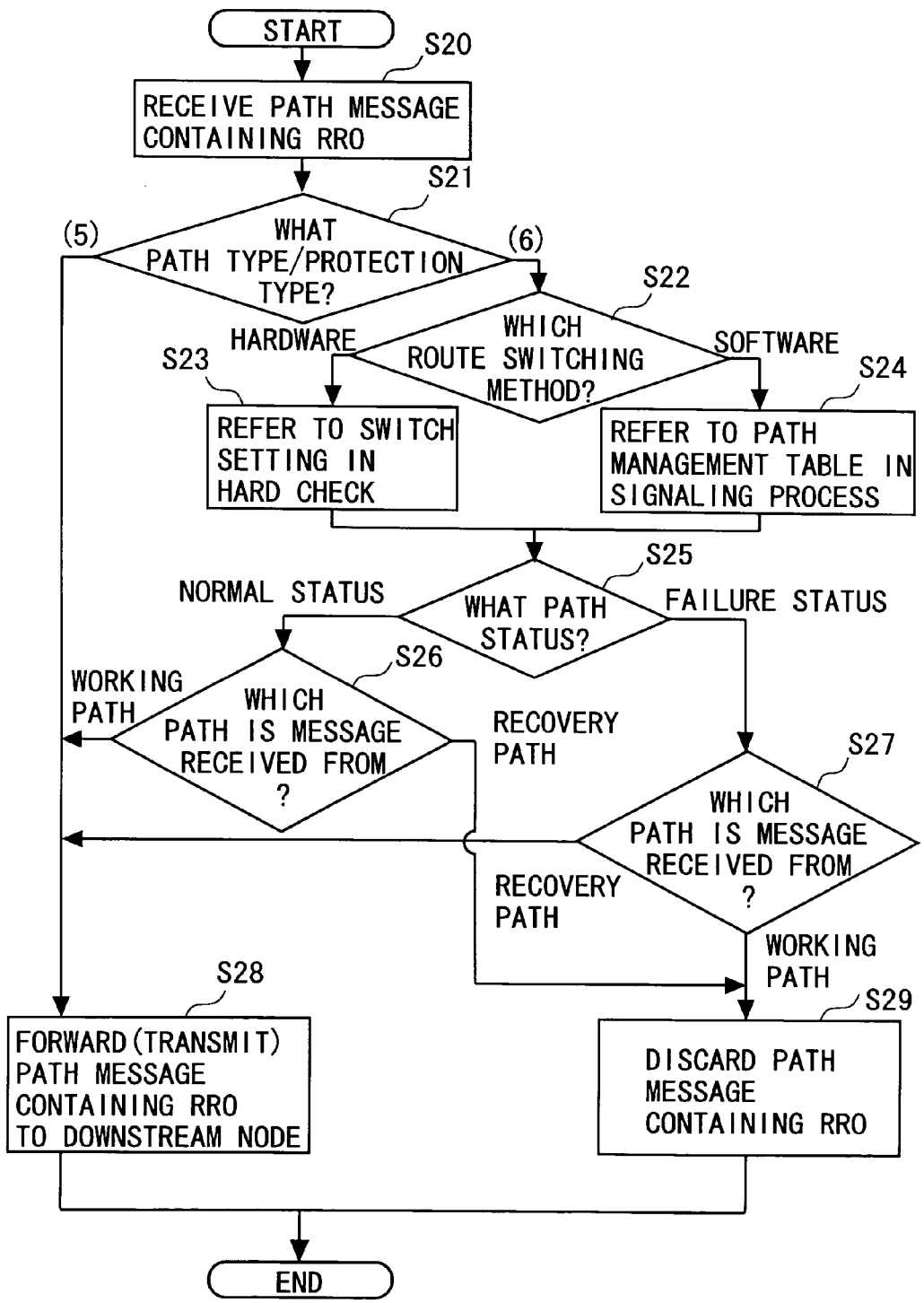
FIG. 11 is a flowchart showing an operational example of the relay device installed at a converging node.

FIG. 11 is a flowchart showing an operational example when the relay device 1a installed at the converging point (LSR 5 in FIG. 7) receives the Path message. Given next is a description of the operational example when the relay device 1a installed at the converging point receives the Path message.

To begin with, the message receiving module 5 receives the Path message containing the RRO (S20). Next, the path route management module 6 judges the type of the path and the type of the protection (S21). In a case (5) of not being the protection that forwards the message to both of the working path and the recovery path, the path route management module 6 determines to forward the Path message to the working path. Then, the message control module 8a adds the address of the self-device 1a to the RRO of the Path message, and the message transmitting module 9 sends this Path message according to the determination made by the path route management module 6 (S28).

On the other hand, in a case (6) of being the protection that forwards the data to both of the working path and the recovery path, the path route management module 6 judges whether the route switching between the working path and the recovery path is autonomously conducted by the hardware or controlled by the software. In the case of the hardwarewise-conducted route switching (S22-hardware), the path route management module 6 refers to the switch setting in the hardware check and thus checks whether in the normal status or in the failure status (S23). While on the other hand, in the case of the softwarewise-controlled route switching (S22-software), the path route management module 6 refers to the path management table in the signaling process, thereby judging whether in the normal status or in the failure status (S24).

Next, the path route management module 6 judges a route serving as a Path message forwarding destination. If the path status is the normal status (S25-normal status) and if the processing target Path message is received from the working path (S26-working path), the path route management module 6 determines to forward the Path message to the working path. Then, the message control module 8a adds the address of the self-device 1a to the RRO of the Path message, and the message transmitting module 9 sends this Path message according to the determination made by the path route management module 6 (S28). If the path status is the normal status (S25-normal status) and if the processing target Path message is received from the recovery path (S26-recovery path), the path route management module 6 determines to discard the received Path message (S29). In this case, the message control module 8a and the message transmitting module 9 execute neither the updating process nor the transmitting process.

If the path status is the failure status (S25-failure status) and if the processing target Path message is received from the recovery path (S27-recovery path), the path route management module 6 creates a Path message afresh and determines to send the message to the working path. The message control module 8a adds the RRO of the received Path message to the newly created Path message. At this time, the message control module 8a adds the address of the self-address 1a to the RRO to be added. Then, the message transmitting module 9 sends this Path message according to the determination made by the path route management module 6 (S28). If the path status is the failure status (S25-failure status) and if the processing target Path message is received from the working path (S27-working path), the path route management module 6 determines to discard the received Path message (S29). In this case, the message control module 8a and the message transmitting module 9 execute neither the updating process nor the transmitting process.

Figure 12:
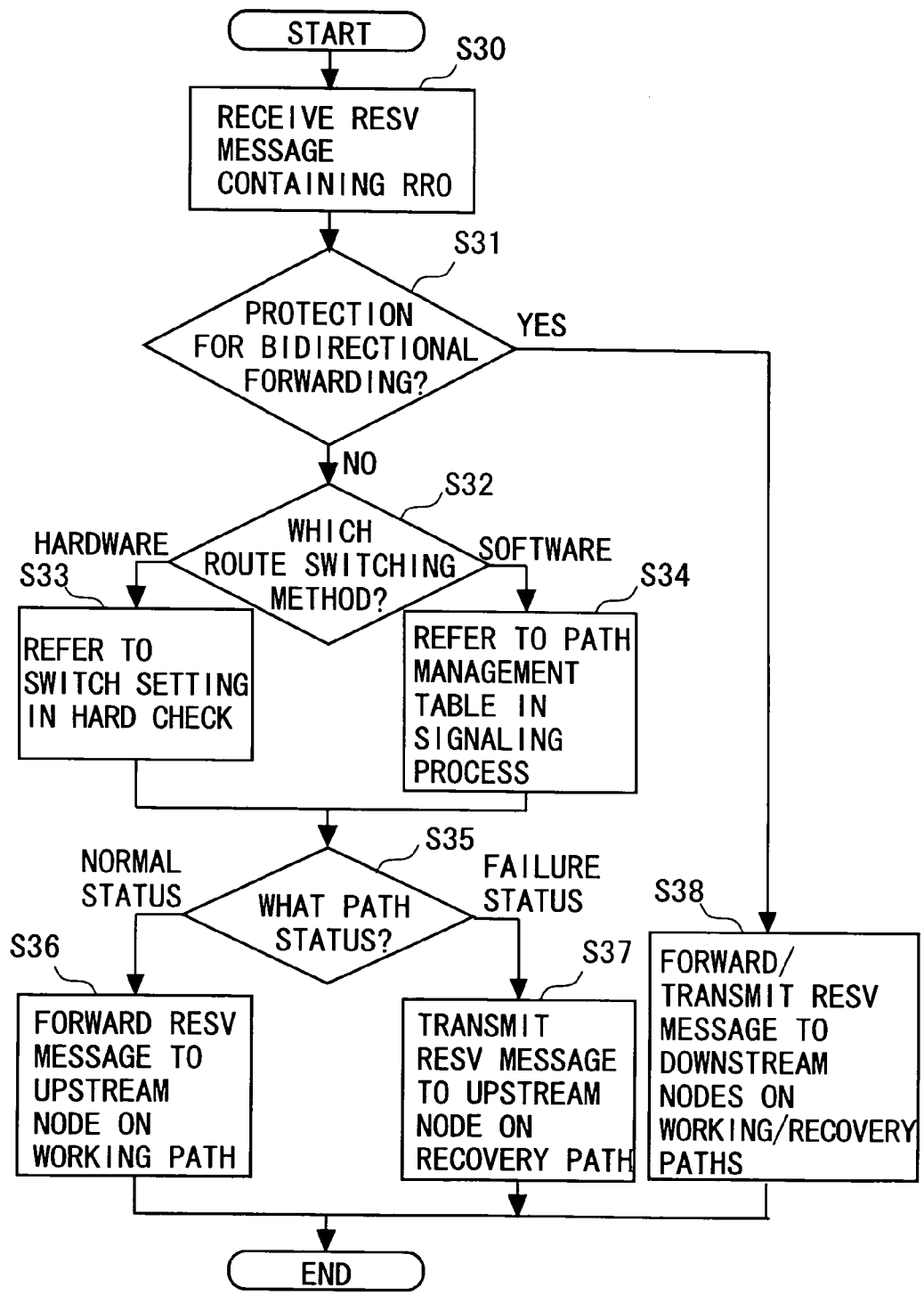
FIG. 12 is a flowchart showing an operational example of the relay device installed at the converging node.

FIG. 12 is a flowchart showing an operational example when the relay device 1a installed at the converging point receives the Resv message. Next, a description of the operational example when the relay device 1a installed at the converging point receives the Resv message, will be given.

The message receiving module 5 receives the Resv message containing the RRO (S30). The path route management module 6 judges whether or not the protection of the path specified by the path ID contained in the Resv message is the protection (e.g., 1+1 protection) that forwards the message to both of the working path and the recovery path. In the case of the protection for the bidirectional path (S31-YES), the path route management module 6 determines to forward the Resv message to both of the working path and the recovery path. Then, the message control module 8a adds the address of the self-device 1a to the RRO of the Resv message, and the message transmitting module 9 sends this Resv message according to the determination made by the path route management module 6 (S38).

On the other hand, in the case of not being the protection for the bidirectional path (S31-NO), the path route management module 6 judges whether the route switching between the working path and the recovery path is autonomously conducted by the hardware or controlled by the software. In the case of the hardwarewise-conducted route switching (S32-hardware), the path route management module 6 refers to the switch setting in the hardware check and thus checks whether in the normal status or in the failure status (S33). While on the other hand, in the case of the softwarewise-controlled route switching (S32-software), the path route management module 6 refers to the path management table in the signaling process, thereby judging whether in the normal status or in the failure status (S34).

Next, the path route management module 6 judges a route serving as a Resv message forwarding destination. If the path status is the normal status (S35-normal status), the path route management module 6 determines to forward the Resv message to the working path. Then, the message control module 8a adds the address of the self-device 1a to the RRO of the Resv message, and the message transmitting module 9 sends this Resv message according to the determination made by the path route management module 6 (S36). If the path status is the failure status (S35-failure status), the path route management module 6 newly creates a Resv message and determines to send the message to the recovery path. The message control module 8a adds the RRO of the received Resv message to the newly created Resv message. At this time, the message control module 8a adds the address of the self-device 1a to the RRO to be added. Then, the message transmitting module 9 sends this Resv message according to the determination made by the path route management module 6 (S37).

<First Operational Example of Network>

Next, an operational example of a network configured by installing the relay devices 1a as the LSRs leastwise at the diverging point and at the converging point, will be described. FIGS. 13 through 25 are diagrams showing an example of the thus-configured network. In FIGS. 13 through 25, the relay device 1a installed at the diverging point corresponds to the LSR 2, while the relay device 1a installed at the converging point corresponds to the LSR 5. Further, in the network illustrated in FIGS. 13 through 25, the working path is built up by the LSR 1, the LSR 2, the LSR 3, the LSR 4, the LSR 5 and the LSR 6, while the recovery path is built up by the LSR 2, the LSR 7, the LSR 8 and the LSR 5. Note that the LSR installed at the diverging point is also called a diverging node in the following description. Moreover, the LSR installed at the converging point is also called a converging node. Still further, in the following description, the explanation will be made on the assumption that the left side corresponds to the upstream side, and the right side corresponds to the downstream side throughout the drawings. Yet further, in the following description, unless particularly explained, each of the Path message and the Resv message contains the RRO. Furthermore, in FIGS. 13 through 25, a short and thin arrowhead-line represents a flow of the Path message or the Resv message. A long and bold solid arrowhead-line indicates a path along which the data flows. A broken arrowhead-line shows a path along which the data does not flow.

Figure 13:
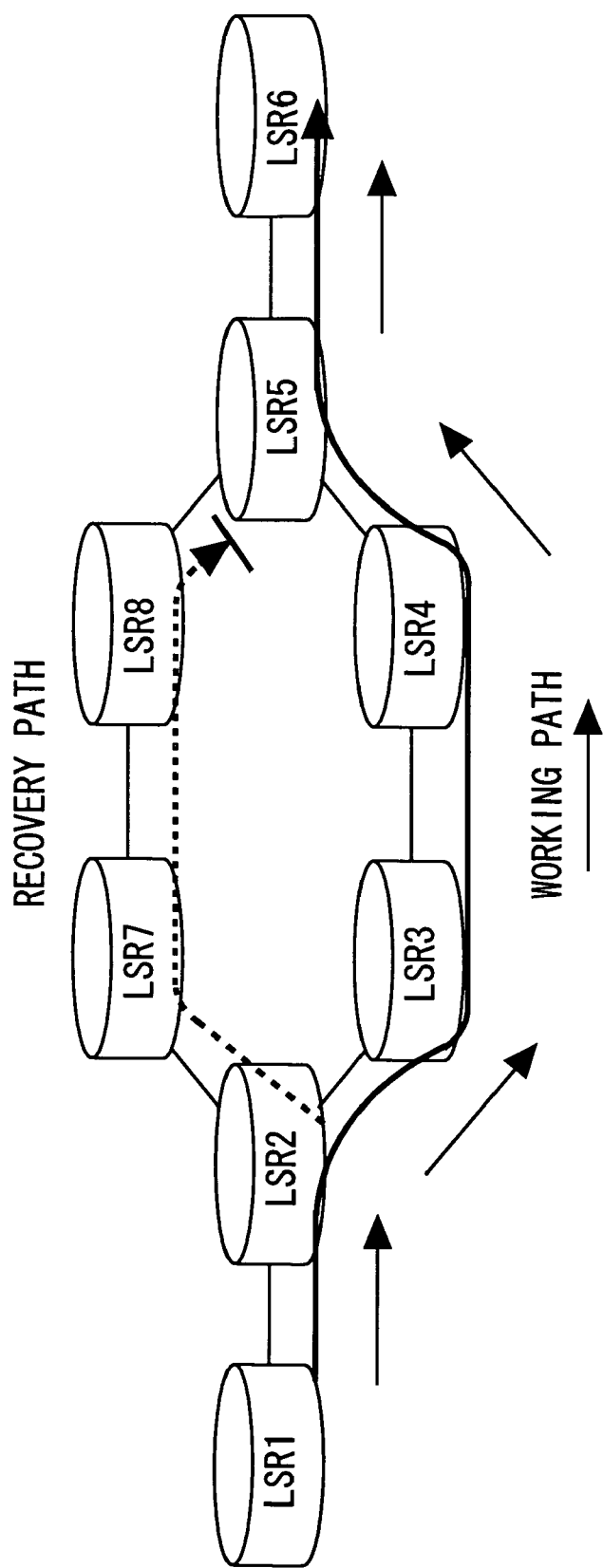
FIG. 13 is a diagram showing a first operational example of a network.

To begin with, a first operational example of the thus-configured network will be described. FIG. 13 is a diagram showing the operational example (the first operational example) of the route trace in the network, wherein the unidirectional 1: 1 protection is in the normal status. In the first operational example, the recovery path is a path that executes the 1: 1 protection for the working path. The first operational example shows a flow of the Path message.

The 1: 1 protection is that the diverging node (LSR 2) forwards the data to the working path in the normal status and forwards the data to the recovery path in the failure status. Further, the diverging node (LSR 5) forwards the data received from the working path to the LSR 6 corresponding to the downstream node in the normal status, and forwards the data received from the recovery path to the LSR 6 corresponding to the downstream node in the failure status.

The LSR 1 serves as a start node making a request for the route trace of the data forwarding route. The start node (LSR 1) sends the Path message to the LSR 2 corresponding to the downstream node. This Path message contains the RRO stored with the address of the LSR 1 itself. The diverging node (LSR 2) receiving the Path message, the network being in the normal status, therefore forwards the received Path message to the downstream node (LSR 3) on the working path. An address of the LSR 2, which has done the forwarding, is added to the RRO of this Path message.

Each of the relay devices (LSR 3, LSR 4) receiving this Path message forwards the received Path message to the downstream node on the working path. An address of each of the LSRs is added afresh to the RRO of this forwarded Path message.

The converging node (LSR 5), when receiving the Path message forwarded via the LSR 3 and the LSR 4, forwards the Path message by performing any one of two types of operations that will hereinafter be explained.

The first operation is an operation of adding, on the assumption that the diverging node (LSR 2) forwards the Path message to a proper path, an address of the self-device to the RRO of the received Path message, and forwarding (transmitting) the Path message stored with the updated RRO to the downstream node (LSR 6) on the working path at all times. In the normal status of the 1: 1 protection, the Path message is forwarded to only the working path (LSR 3, LSR 4) through the operation of the diverging node (LSR 2), and consequently any problems do not occur.

The second operation is an operation of adding the address of the self-device to the RRO of the Path message received from one path in accordance with the present status of the network, forwarding (transmitting) the Path message stored with the updated RRO to the downstream node (LSR 6), and discarding the Path message received from the other path. In the first operational example, the network is in the normal status in the case of carrying out the second operation, so that the converging node (LSR 5) forwards the Path message received from the upstream node (LSR 4) on the working path to the downstream node (LSR 6) on the working path. On the other hand, the converging node (LSR 5) discards the Path message received from the upstream node (LSR 8) on the recovery path.

The message may be forwarded (transmitted) either by the first operation or by the second operation. An address of the LSR 5 is newly added to the RRO of the Path message forwarded to the downstream node (LSR 6) from the converging node (LSR 5). When the LSR 6 corresponding to the end node receives this Path message, it follows that the addresses of all the nodes (all the LSRs) on the data forwarding route will have been stored in the RRO, thus completing the trace of the data forwarding route.

<Second Operational Example of Network>

Figure 14:
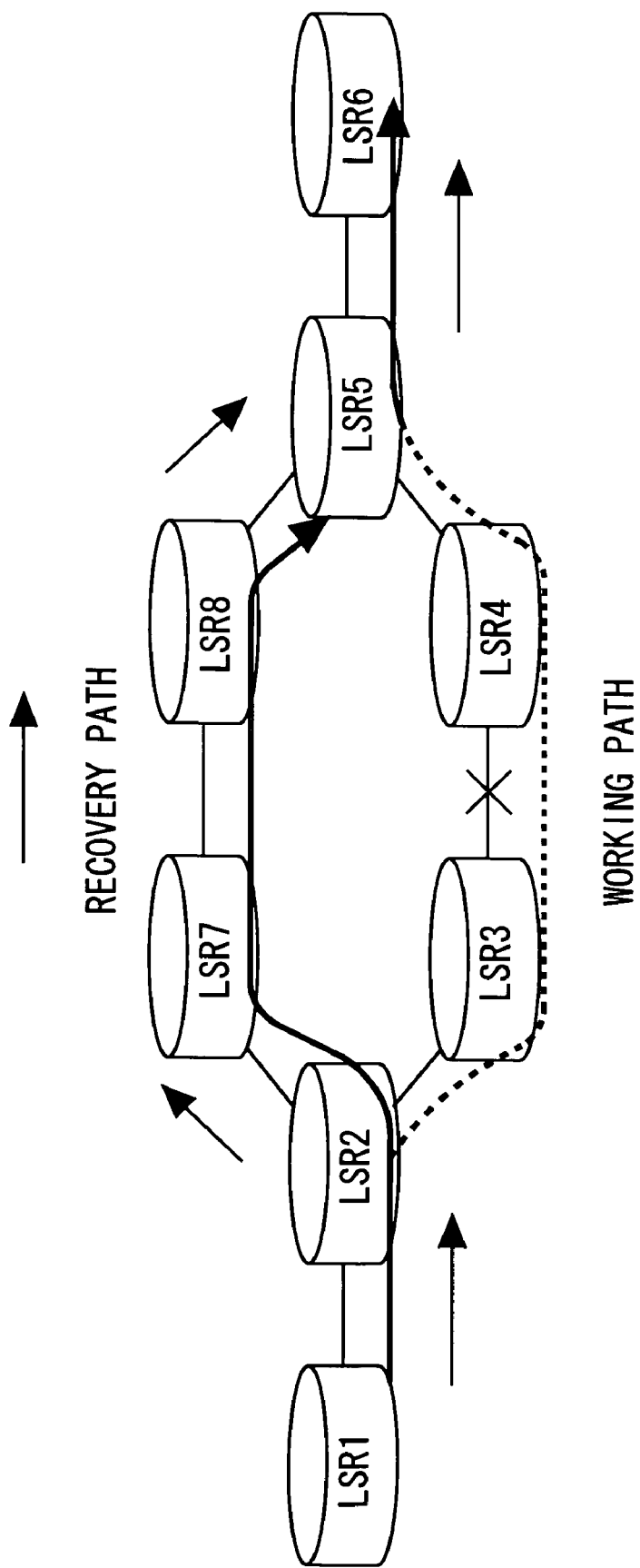
FIG. 14 is a diagram showing a second operational example of the network.

FIG. 14 is a diagram showing the operational example (the second operational example) of the route trace in the network with the unidirectional 1: 1 protection in the failure status. In the second operational example also, the recovery path is a path that executes the 1: 1 protection for the working path. In the second operational example, the case where a failure occurs between LSR 3 and LSR 4 is assumed. The second operational example shows a flow of the Path message.

In this case, the operation of the LSR 1 is the same as in the first operational example, and hence its explanation is omitted. The diverging node (LSR 2) receiving the Path message, the network being in the failure status, therefore creates a Path message afresh and sends the created Path message to the downstream node (LSR 7) on the recovery path. The RRO of this Path message is what the address of the LSR 2 that has done the forwarding is added to the RRO stored in the received Path message.

Each of the relay devices (LSR 7, LSR 8) receiving this Path message forwards the received Path message to the downstream node on the recovery path. An address of each of the LSRs is newly added to the RRO of this forwarded Path message.

The converging node (LSR 5), when receiving the Path message forwarded via the LSR 7 and the LSR 8, forwards (transmits) the Path message by performing any one of the first operation and the second operation. In the failure status of the 1: 1 protection, the Path message is transmitted to only the recovery path (LSR 7, LSR 8) through the operation of the diverging node (LSR 2), and consequently any problems do not occur even when the first operation is executed. Further, when the second operation is executed, as the present network status is the failure status, the converging node (LSR 5) discards the Path message received from the upstream node (LSR 4) on the working path, stores the newly-created Path message with the RRO stored in the Path message received from the upstream node (LSR 8) on the recovery path, and sends this Path message to the downstream node (LSR 6).

An address of the LSR 5 is newly added to the RRO of the Path message forwarded to the downstream node (LSR 6) from the converging node (LSR 5). When the LSR 6 corresponding to the end node receives this Path message, it follows that the addresses of all the nodes (all the LSRs) on the data forwarding route will have been stored in the RRO, thus completing the trace of the data forwarding route.

<Third Operational Example of Network>

Figure 15:
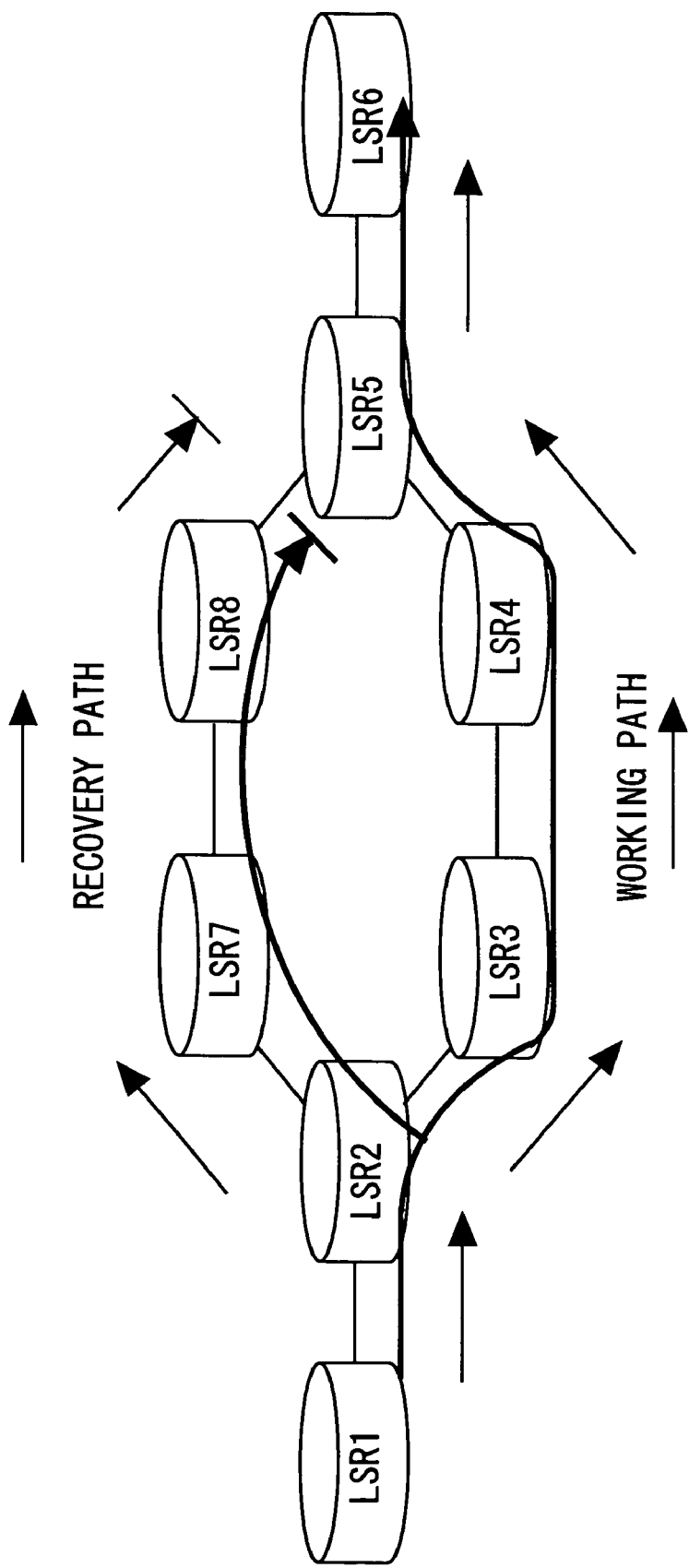
FIG. 15 is a diagram showing a third operational example of the network.

FIG. 15 is a diagram showing the operational example (a third operational example) of the route trace in the network with the unidirectional 1+1 protection in the normal status. In the third operational example, the recovery path is a path that executes the 1+1 protection for the working path. The third operational example shows a flow of the Path message.

In the 1+1 protection, the diverging node (LSR 2), irrespective of whether the network is in the normal status or in the failure status, always forwards the data received from the working path to the downstream nodes (LSR 3, LSR 7) on both of the working path and the recovery path.

The converging node (LSR 5), if in the normal status, forwards the data received from the working path to the downstream node (LSR 6). On the other hand, the converging node (LSR 5), if in the failure status, forwards the data received from the recovery path to the downstream node (LSR 6).

The LSR 1 serves as the start node making a request for the route trace of the data forwarding route. The start node (LSR 1) sends the Path message to the LSR 2 corresponding to the downstream node. This Path message contains the RRO stored with the address of the LSR 1 itself. The diverging node ('LSR 2) receiving the Path message forwards the received Path message to the downstream node (LSR 3) on the working path, and sends the newly-created Path message to the downstream node (LSR 7) on the recovery path. An address of the LSR 2, which has newly forwarded (transmitted) the Path message, is added to the RROs of these two Path messages.

The respective nodes (LSR 3, LSR 7) on the working path and the recovery path, which have received the Path messages, forward the received Path messages to the downstream nodes (LSR 4, LSR 8) on the respective paths. Then, the Path messages forwarded along the respective paths are forwarded to the converging node (LSR 5). Addresses of the respective LSRs on the individual paths are added to the Path messages forwarded to the converging node (LSR 5).

The converging node (LSR 5), because of the normal status in which the data is forwarded along the working path, forwards the Path message received from the upstream node (LSR 4) on the working path to the downstream node (LSR 6) on the working path. On the other hand, the converging node (LSR 5) discards the Path message received from the upstream node (LSR 8) on the recovery path. The address of the LSR 5 is newly added to the RRO of the Path message forwarded to the downstream node (LSR 6) from the converging node (LSR 5). When this Path message is received by the LSR 6 corresponding to the end node, it follows that the addresses of all the nodes (all the LSRs) on the data forwarding route will have been stored in the RRO, thus completing the trace of the data forwarding route.

<Fourth Operational Example of Network>

Figure 16:
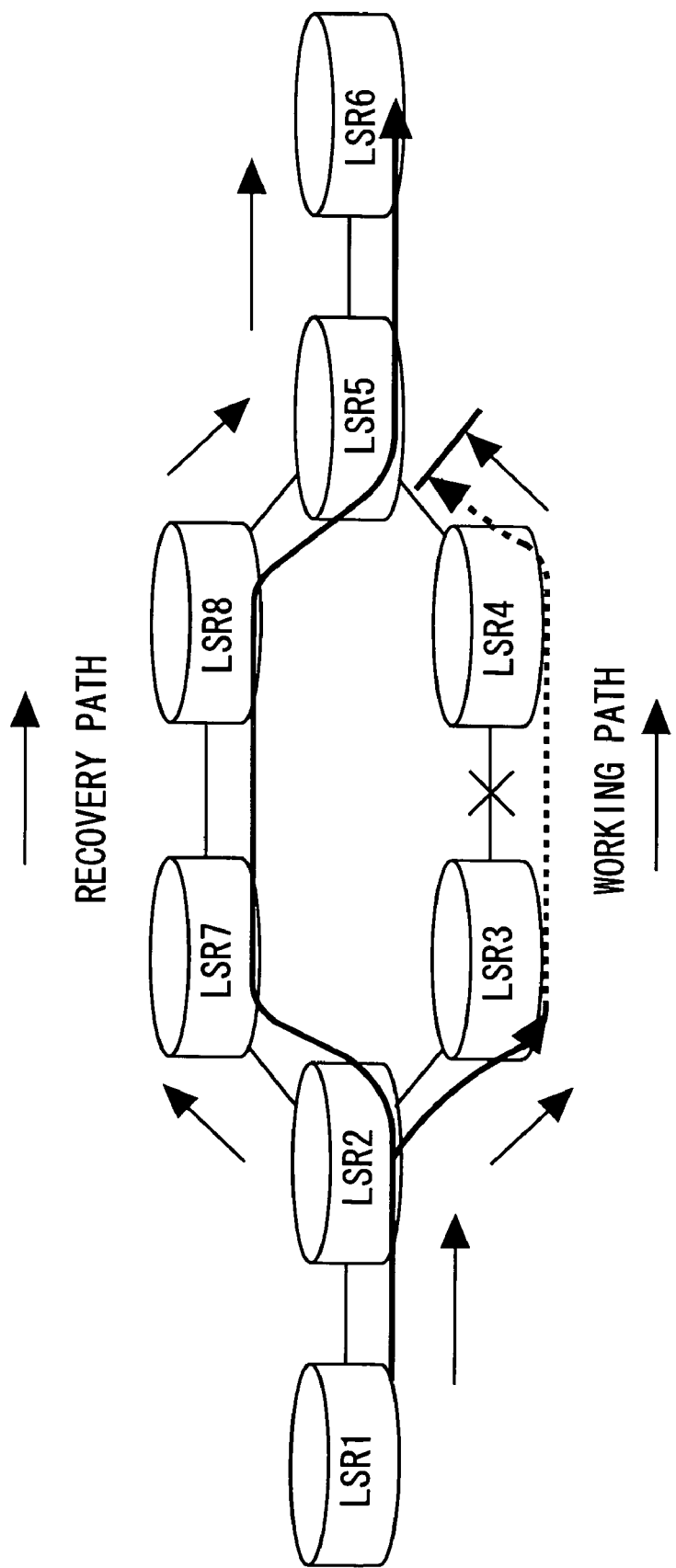
FIG. 16 is a diagram showing a fourth operational example of the network.

FIG. 16 is a diagram showing the operational example (a fourth operational example) of the route trace in the network with the unidirectional 1+1 protection in the failure status. In the fourth operational example also, the recovery path is a path that executes the 1+1 protection for the working path. In the fourth operational example, the case where a failure occurs between LSR 3 and LSR 4 is assumed. The fourth operational example shows a flow of the Path message.

In this case, the operations of the respective LSRs other than the LSR 5 are the same as those in the third operational example, and hence their explanations are omitted. The converging node (LSR 5) receiving the Path message, because of the failure status in which the data is forwarded along the recovery path, adds the address of the self-device (LSR 5) to the RRO of the Path message received from the upstream node (LSR 8) on the recovery path, and sends a new message stored with the updated RRO to the downstream node (LSR 6) on the working path. On the other hand, the converging node (LSR 5) discards the Path message received from the upstream node (LSR 4) on the working path. When this Path message is received by the LSR 6 corresponding to the end node, it follows that the addresses of all the nodes (all the LSRs) on the data forwarding route will have been stored in the RRO, thus completing the trace of the data forwarding route.

Note that a failure occurs in a section extending from the LSR 3 to the LSR 4, and hence it can be assumed that the Path message sent along the working path might not reach the converging node (LSR 5). In a case such as preparing another recovery path from the LSR 3 to the LSR 4, however, it can be assumed that the Path message sent via the LSR 3 and the LSR 4 along this recovery path might reach the converging node (LSR 5).

<Fifth Operational Example of Network>

Figure 17:
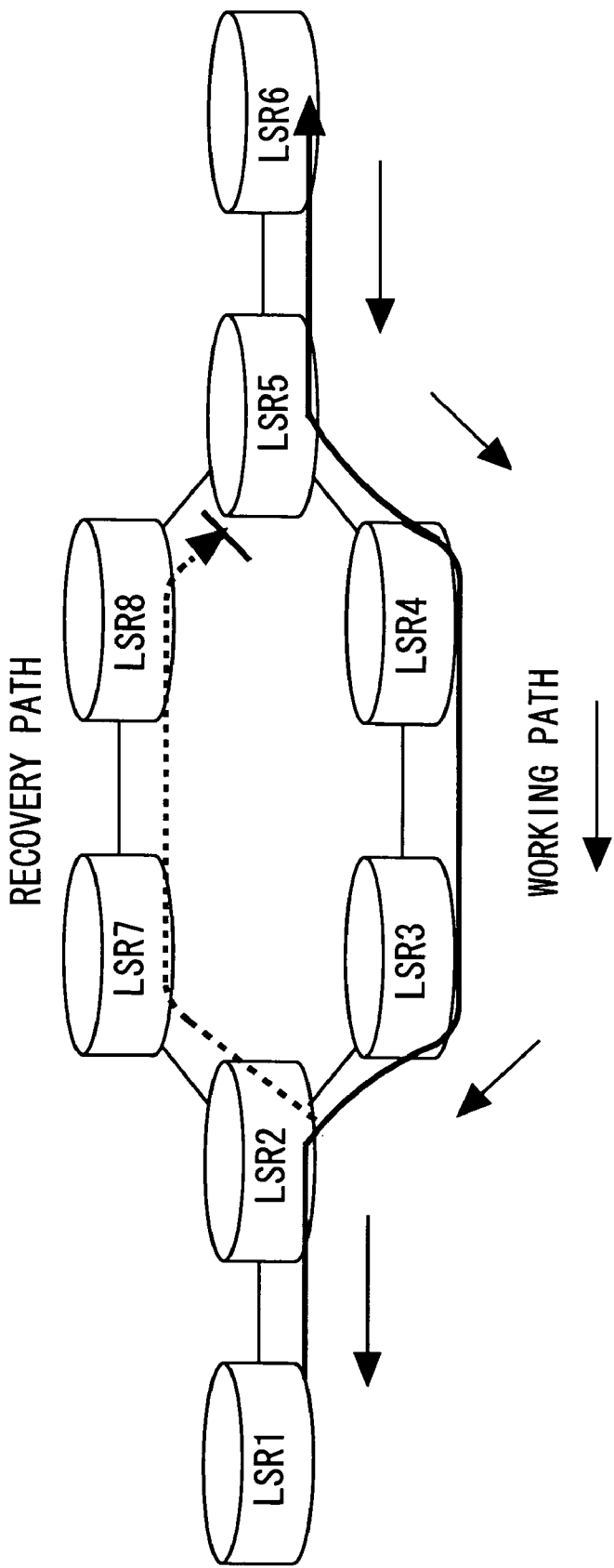
FIG. 17 is a diagram showing a fifth operational example of the network.

FIG. 17 is a diagram showing a flow of the Resv message in the same network architecture as in the case of the first operational example. Hereinafter, the flow of the Resv message in this network architecture will be explained.

To start with, the end node (LSR 6) sends the Resv message to the upstream node (LSR 5). This Resv message contains the RRO stored with the address of the LSR 6. The converging node (LSR 5) receiving this Resv message, the network being in the normal status wherein the data is forwarded along the working path, therefore forwards the Resv message to the upstream node (LSR 4) on the working path. The address of the converging node (LSR 5), which has done the forwarding, is added afresh to the RRO of this Resv message.

Each of the working path nodes (LSR 4, LSR 3) receiving the Resv message forwards the Resv message to the upstream node on the working path. At this time, each of the LSRs on the working path adds its own address to the RRO of the Resv message to be forwarded. Then, the diverging node (LSR 2), upon receiving the forwarded Resv message, forwards the Resv message by performing any one of the following two types of operations.

The first operation is an operation of adding, on the assumption that the diverging node (LSR 5) forwards the Path message to a proper path, an address of the self-device to the RRO of the received Resv message, and forwarding (transmitting) the Resv message stored with the updated RRO to the upstream node (LSR 1) on the working path at all times. In the normal status of the 1:1 protection, the Resv message is forwarded to only the working path (LSR 4, LSR 3) through the operation of the diverging node (LSR 5), and consequently any problems do not occur.

The second operation is an operation of adding the address of the self-device to the RRO of the Resv message received from one path in accordance with the present status of the network, forwarding (transmitting) the Resv message stored with the updated RRO to the upstream node (LSR 1), and discarding the Resv message received from the other path. In the fifth operational example, the network is in the normal status in the case of carrying out the second operation, so that the diverging node (LSR 2) forwards the Resv message received from the downstream node (LSR 3) on the working path to the upstream node (LSR 1) on the working path. On the other hand, the diverging node (LSR 2) discards the Resv message received from the downstream node (LSR 7) on the recovery path.

The message may be forwarded (transmitted) either by the first operation or by the second operation. An address of the LSR 2 is newly added to the RRO of the Resv message forwarded (transmitted) to the upstream node (LSR 1) from the diverging node (LSR 2). When the LSR 1 corresponding to the start node receives this Resv message, it follows that the addresses of all the nodes (all the LSRs) on the data forwarding route will have been stored in the RRO, thus completing the trace of the data forwarding route.

<Sixth Operational Example of Network>

Figure 18:
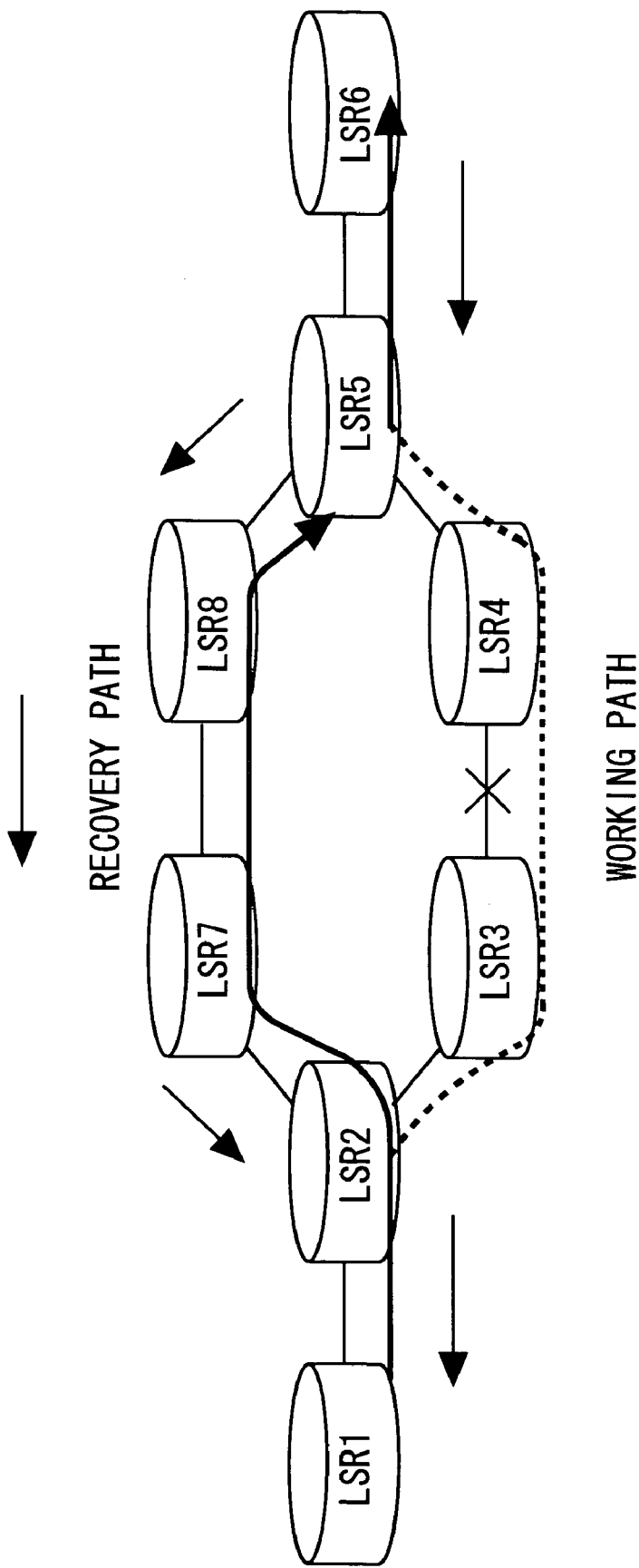
FIG. 18 is a diagram showing a sixth operational example of the network.

FIG. 18 is a diagram showing the operational example (a sixth operational example) of the route trace in the network with the unidirectional 1:1 protection in the failure status. In the sixth operational example also, the recovery path is a path that executes the 1:1 protection for the working path. In the sixth operational example, the case where a failure occurs between LSR 3 and LSR 4 is assumed. The sixth operational example shows a flow of the Resv message.

In this case, the operation of the LSR 6 is the same as that in the fifth operational example, and hence its explanation is omitted. The converging node (LSR 5) receiving the Resv message, the network being in the failure status, therefore creates a Resv message afresh and sends the created Resv message to the upstream node (LSR 8) on the recovery path. The RRO of this Resv message is what the address of the LSR 5 that has done the forwarding is added to the RRO stored in the received Resv message.

Each of the relay devices (LSR 8, LSR 7) receiving this Resv message forwards the received Resv message to the downstream node on the recovery path. An address of each of the LSRs is newly added to the RRO of this forwarded Resv message.

The diverging node (LSR 2), when receiving the Resv message forwarded via the LSR 8 and the LSR 7, forwards (transmits) the Resv message by performing any one of the first operation and the second operation. In the failure status of the 1:1 protection, the Resv message is transmitted to only the recovery path (LSR 8, LSR 7) through the operation of the converging node (LSR 5), and consequently any problems do not occur even when the first operation is executed. Further, when the second operation is executed, as the present network status is the failure status, the diverging node (LSR 2) discards the Resv message received from the downstream node (LSR 3) on the working path, and stores the newly-created Resv message with the RRO stored in the Resv message received from the downstream node (LSR 7) on the recovery path. Then, the node adds the address of the self-device to this RRO and sends this Resv message to the upstream node (LSR 1).

An address of the LSR 2 is newly added to the RRO of the Resv message transmitted to the upstream node (LSR 1) from the diverging node (LSR 2). When the LSR 1 corresponding to the start node receives this Resv message, it follows that the addresses of all the nodes (all the LSRs) on the data forwarding route will have been stored in the RRO, thus completing the trace of the data forwarding route.

<Seventh Operational Example of Network>

Figure 19:
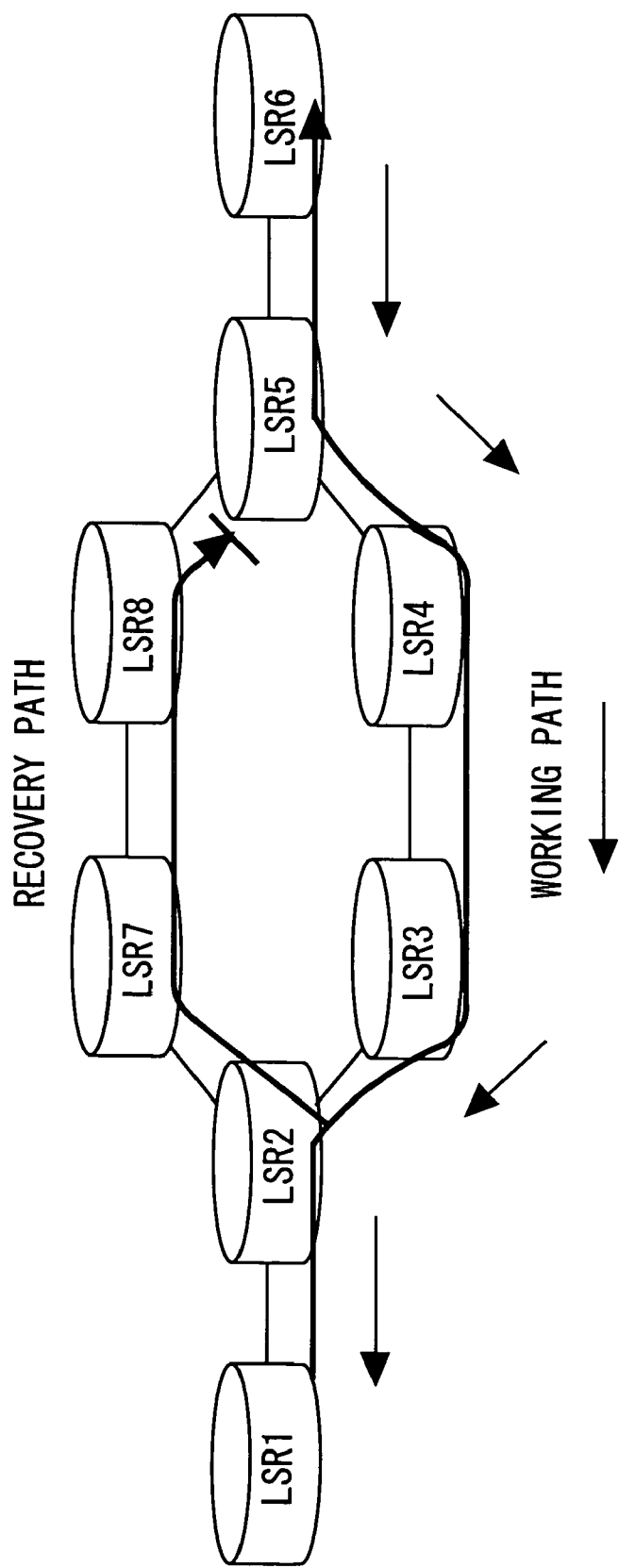
FIG. 19 is a diagram showing a seventh operational example of the network.

FIG. 19 is a diagram showing the operational example (a seventh operational example) of the route trace in the network with the unidirectional 1+1 protection in the normal status. In the seventh operational example, the recovery path is a path that executes the 1+1 protection for the working path. The seventh operational example shows a flow of the Resv message.

The end node (LSR 6) sends the Resv message to the LSR 5 corresponding to the upstream node. This Resv message contains the RRO stored with the address of the LSR 6 itself.

The converging node (LSR 5) receiving Resv message, the present network status being the normal, therefore forwards the received Resv message to the upstream node (LSR 4) on the working path. The address of the LSR 5, which has newly forwarded the Resv message, is added to the RRO of this Resv message.

Each of the nodes (LSR 4, LSR 3) receiving the Resv message forwards the received Resv message, and the Resv message is forwarded to the diverging node (LSR 2). The addresses of the LSR 4 and the LSR 3 are added to the RRO of the Resv message forwarded to the diverging node (LSR 2).

The diverging node (LSR 2) always forwards the received Resv message to the upstream node (LSR 1) on the working path. An address of the LSR 2 is newly added to the RRO of the Resv message forwarded to the upstream node (LSR 1) from the diverging node (LSR 2). When the LSR 1 corresponding to the start node receives this Resv message, it follows that the addresses of all the nodes (all the LSRs) on the data forwarding route will have been stored in the RRO, thus completing the trace of the data forwarding route.

<Eighth Operational Example of Network>

Figure 20:
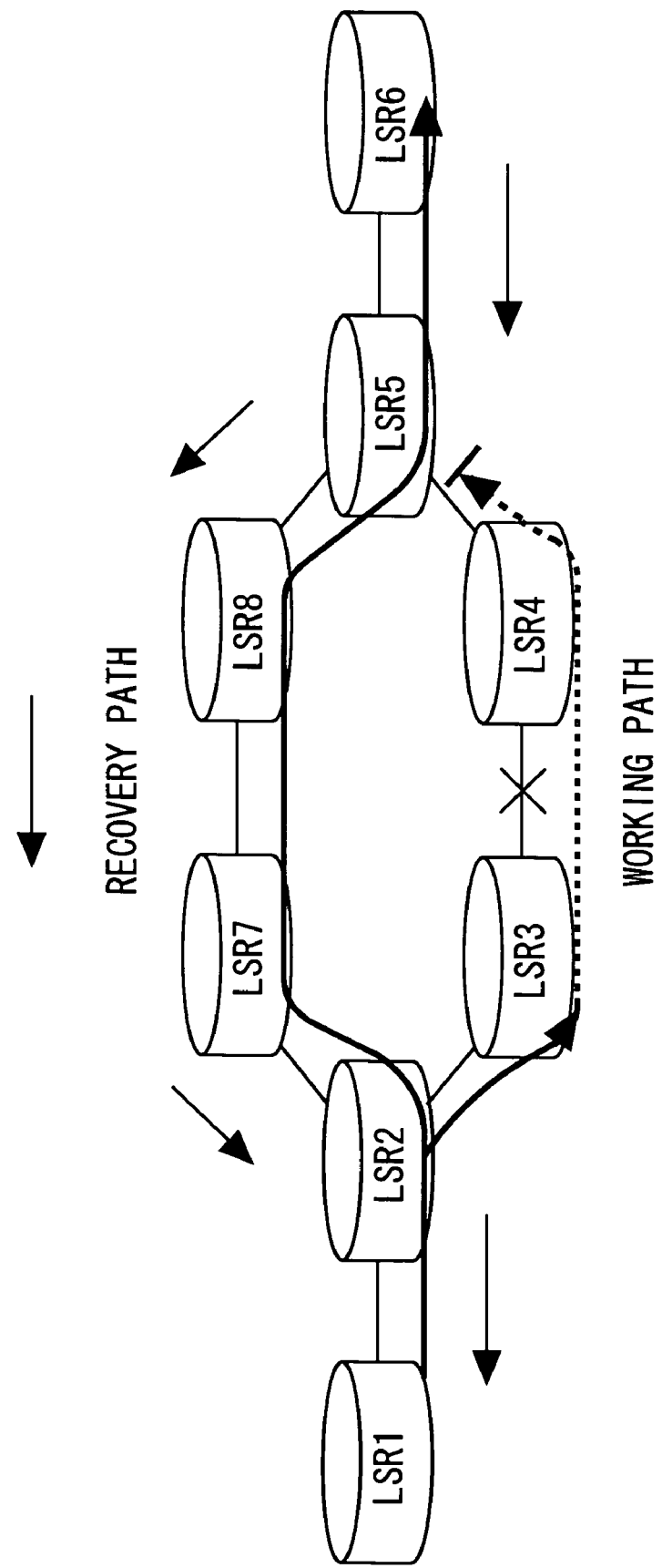
FIG. 20 is a diagram showing an eighth operational example of the network.

FIG. 20 is a diagram showing the operational example (an eighth operational example) of the route trace in the network with the unidirectional 1+1 protection in the failure status. In the eighth operational example also, the recovery path is a path that executes the 1+1 protection for the working path. In the eighth operational example, the case where a failure occurs between LSR 3 and LSR 4 is assumed. The eighth operational example shows a flow of the Resv message.

In this case, the operations of the respective LSRs other than the LSR 5 are the same as those in the seventh operational example, and hence their explanations are omitted. The converging node (LSR 5) receiving the Resv message, the network status being the failure status in which the data is forwarded along the recovery path, therefore sends the newly-created Resv message to the upstream node (LSR 8) on the recovery path. At this time, the diverging node (LSR 2) adds the RRO stored in the received Resv message to the newly-created Resv message, and adds the address of the self-device to this RRO. When this Resv message is received by the LSR 1 corresponding to the start node, it follows that the addresses of all the nodes (all the LSRs) on the data forwarding route will have been stored in the RRO, thus completing the trace of the data forwarding route.

<Ninth Operational Example of Network>

The GPMLS enables not only the unidirectional path but also the bidirectional path to be established. In ninth and tenth operational examples, the operational examples in the network having the bidirectional path will be explained. In advance of the descriptions on the ninth and tenth operational examples, at first the network having the bidirectional path will be described.

Figure 21:
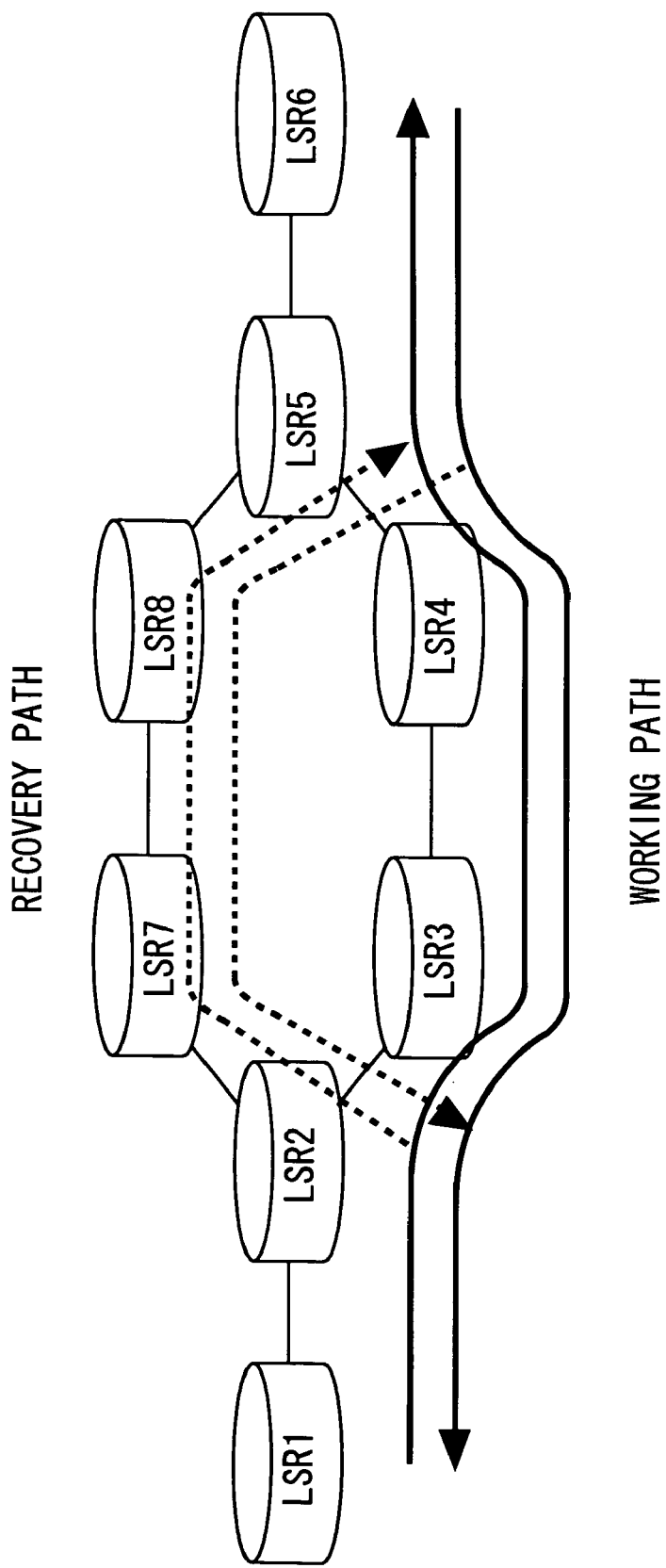
FIG. 21 is a diagram showing an example of a bidirectional path.
Figure 22:
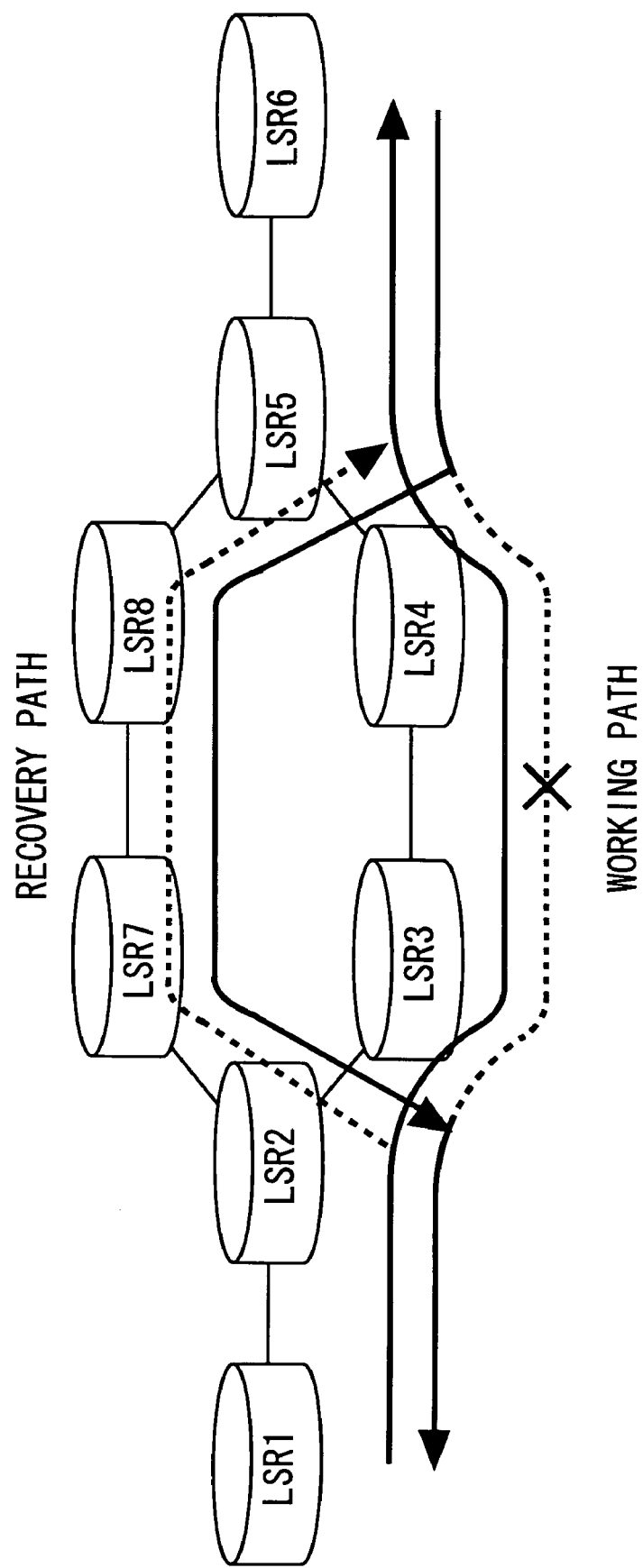
FIG. 22 is a diagram showing an example of unidirectional route switching when a failure occurs in the bidirectional path.
Figure 23:
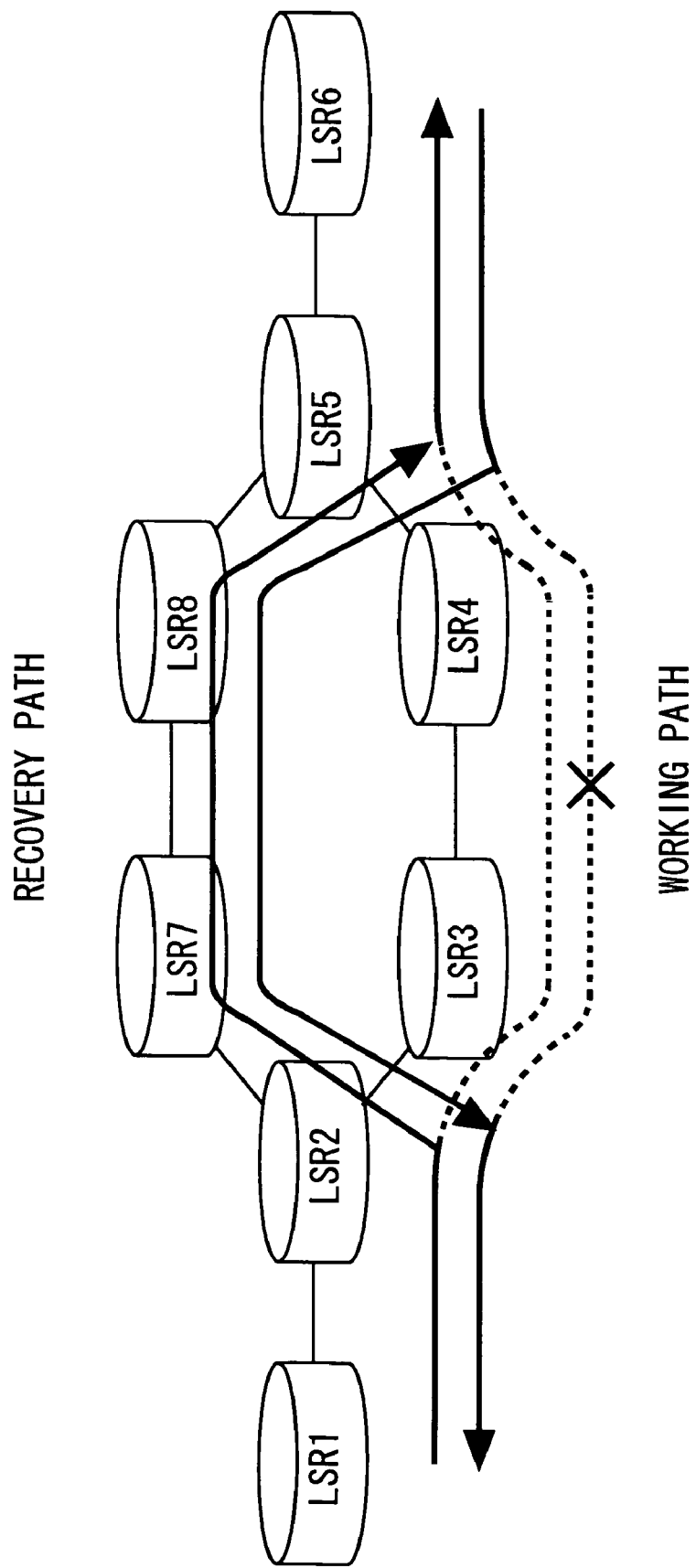
FIG. 23 is a diagram showing an example of bidirectional route switching when the failure occurs in the bidirectional path.

FIGS. 21 through 23 are diagrams each showing an example of a network architecture having a bidirectional path. The bidirectional path will hereinafter be explained. FIG. 21 is the diagram showing an example of a configuration of the bidirectional path in the normal status wherein any failure does not occur. In the normal status wherein no failure occurs, the path in the forward direction (the right direction in FIG. 21) and the path in the backward direction (the left direction in FIG. 21) (which are the two paths indicated by solid arrow-lines in FIG. 21) run through the same route.

FIGS. 22 and 23 are the diagrams each showing the example of the configuration of the bidirectional path in the failure status wherein the failure occurs. If the failure occurs, the bidirectional path can take two modes. The first mode is that the route switching is conducted asynchronously (independently) with respect to the forward-direction path and the backward-direction path. FIG. 22 shows this type of first mode. As shown in FIG. 22, if the failure occurs only in the backward-directional path, the route is switched over to the recovery path from the working path with respect to only the backward-direction path. Then, the route switching is not performed with respect to the forward-direction path that is not affected by the failure. The second mode is that the route switching is conducted synchronously (in linkage) with respect to the forward-direction path and the backward-direction path. FIG. 23 shows this type of second mode. As shown in FIG. 23, even when the failure occurs only in the backward-direction path, the route is switched over to the recovery path from the working path in both of the forward-direction path and the backward-direction path.

In the route trace of the forward-direction path, the technology of the route trace in the unidirectional path as explained earlier may be applied, whether in the first mode or the second mode. Further, the route trace of the backward-direction path in the second mode can be actualized by applying the route trace procedure of the forward-direction path explained before. On the other hand, in the case of performing the route switching asynchronously (independently) with respect to the forward-direction path and the backward-direction path as in the first mode, the route trace of the backward-direction path can be actualized by replacing the Path message with the Resv message and forwarding the Resv message according to the status of the backward-direction path.

Note that in the case of explaining the backward-direction path, the diverging node becomes the LSR 5, and the converging node becomes the LSR 2. Further, in the case of describing the backward-direction path, the upstream side corresponds to the left side, and the downstream side corresponds to the right side.

Figure 24:
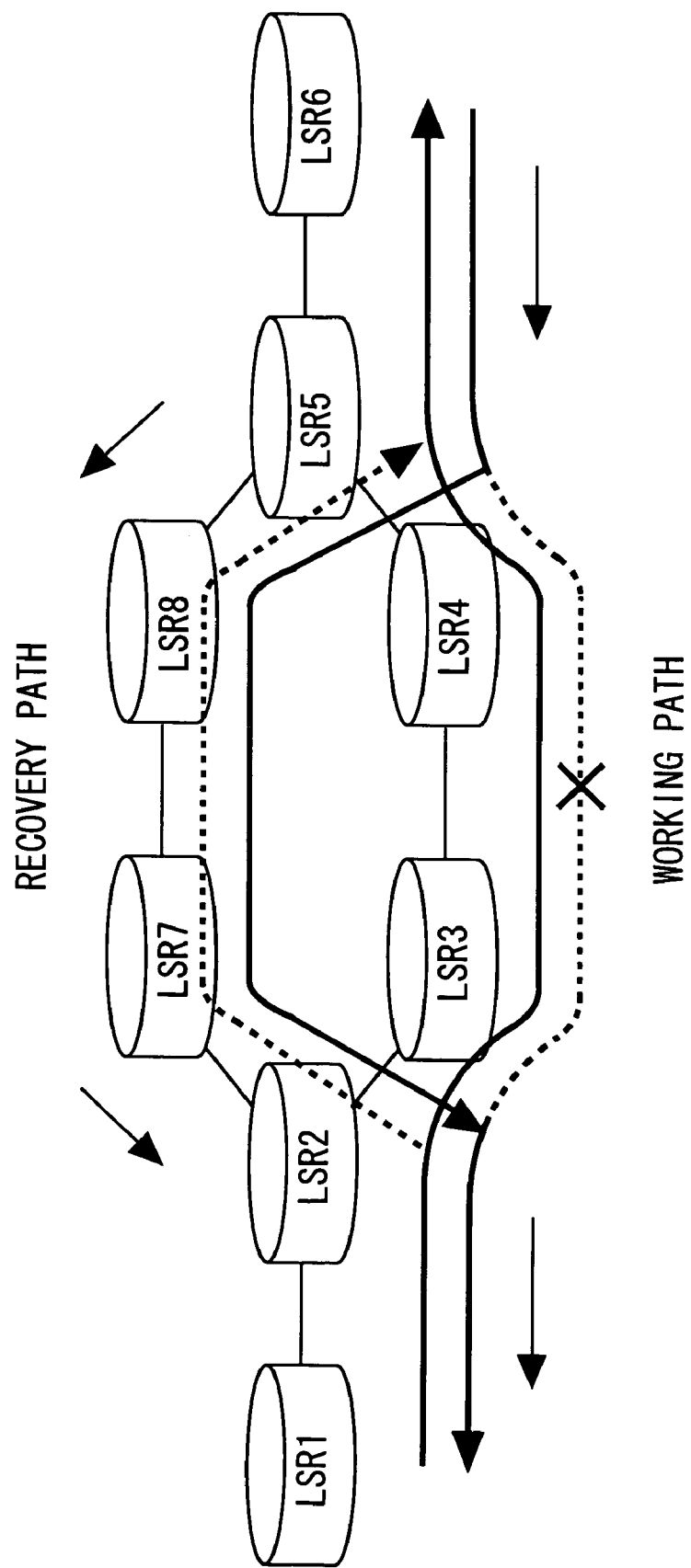
FIG. 24 is a diagram showing a ninth operational example of the network.

Next, the ninth operational example will be explained. FIG. 24 is a diagram showing a route trace procedure (the ninth operational example) in a case where the failure occurs in the 1:1 protection that executes the asynchronous switching in the bidirectional path. In this case, the diverging node (LSR 5) in the backward-direction path forwards the data to the recovery path, while the converging node (LSR 2) in the backward direction forwards the data received from the recovery path to the downstream node (LSR 6). An in-depth description of this operation will be given below.

To begin with, the start node (LSR 6) on the backward-direction path, which makes a request for the trace of the data transfer route, sends the Resv message to the downstream node (LSR 5) on the backward-direction path. This Resv message contains the RRO stored with the address (LSR 6) of the LSR 6 performing the transmission. The backward-direction path diverging node (LSR 5) receiving this Resv message, the present network status being the failure status, therefore sends a newly-created Resv message to the downstream node (LSR 8) on the recovery path in the backward direction. This Resv message receives an addition of the RRO stored in the received Resv message. An address of the LSR 5, which has newly done the forwarding, is added to the RRO of this Resv message. Each of the recovery path nodes (LSR 8, LSR 7) receiving this Resv message forwards the Resv message received each. Then, the Resv message sent via the recovery path reaches the converging node (LSR 2) in the backward direction. At this time, the addresses of the respective nodes (LSR 8, LSR 7) on the recovery path are added to the RRO of the Resv message.

The converging node (LSR 2) on the backward-direction path receiving the Resv message sends the Resv message by performing any one of the following two operations.

The first operation is an operation of transmitting, on the assumption that the diverging node (LSR 5) on the backward-direction path forwards the Resv message to a proper path, a new Resv message containing the RRO contained in the received Resv message to the downstream node (LSR 1) on the working path in the backward direction at all times. At this time, the address of the LSR 2 performing the transmission is added to the RRO of the Resv message to be sent. In the failure status of the 1:1 protection, the Resv message is sent to only the recovery path (LSR 8, LSR 7) through the operation of the diverging node (LSR 5) in the backward direction, and consequently any problems do not occur.

The second operation is an operation of forwarding the Resv message stored with the RRO contained in the Resv message received from one path to the downstream node (LSR 1) in the backward direction in accordance with the present status of the network, and discarding the Path message received from the other paths. In the ninth operational example, the network in the backward direction is in the failure status in the case of carrying out the second operation, so that the converging node (LSR 2) in the backward direction transmits to the LSR 1 a new Resv message containing the RRO stored in the Resv message received from the upstream node (LSR 7) on the recovery path. On the other hand, the converging node (LSR 2) in the backward direction discards the Resv message received from the upstream node (LSR 3) on the working path.

The Resv message may be forwarded (transmitted) either by the first operation or by the second operation. At this time, the address of the LSR 2 is newly added to the Resv message forwarded (transmitted) by the converging node (LSR 2) in the backward direction. When this Resv message reaches the LSR1 serving as the end node in the backward direction, the addresses of all the nodes on the data forwarding route are stored in the RRO, thus completing the trace of the data forwarding route.

<Tenth Operational Example of Network>

Figure 25:
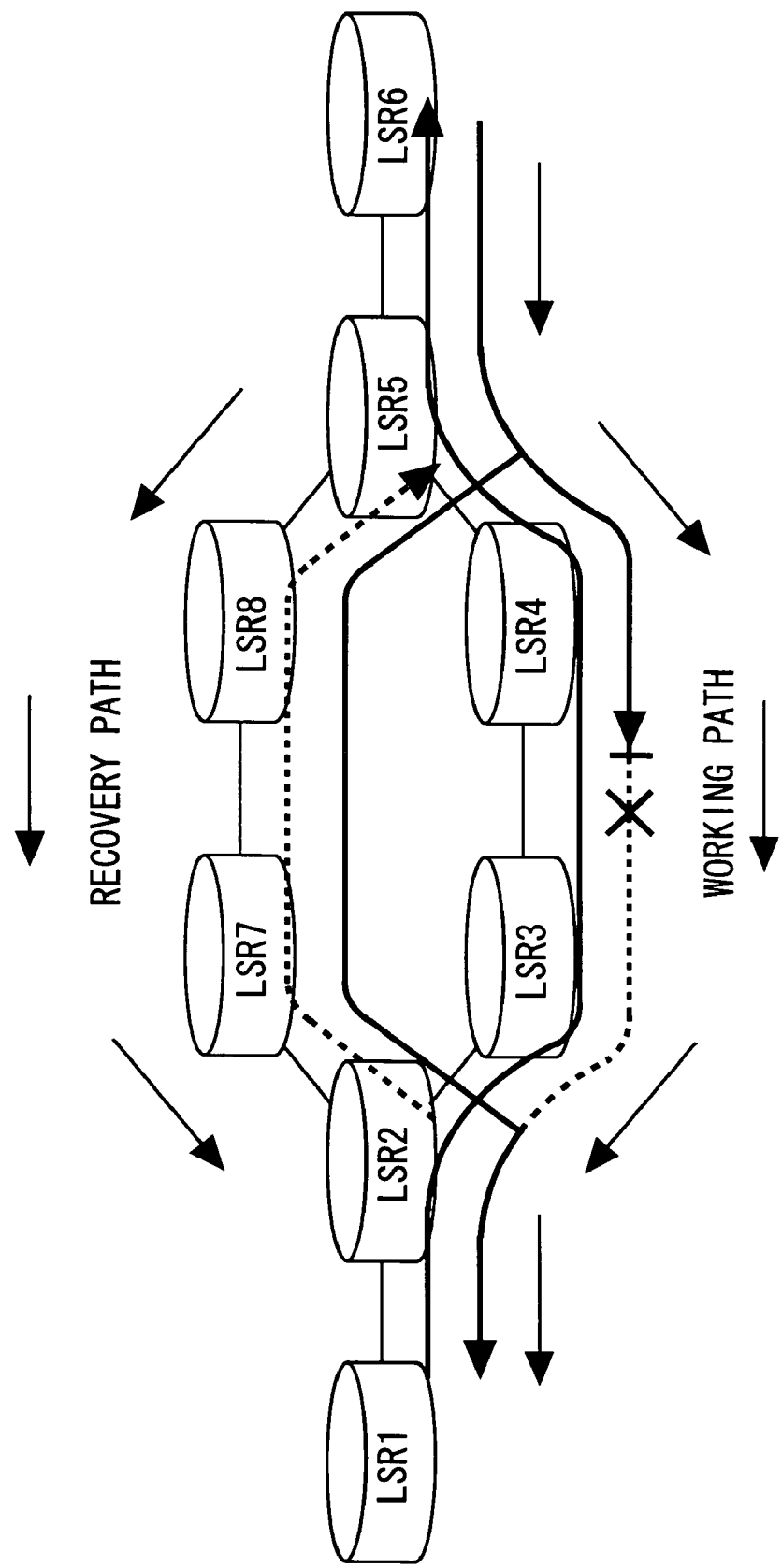
FIG. 25 is a diagram showing a tenth operational example of the network.
Figure 26:
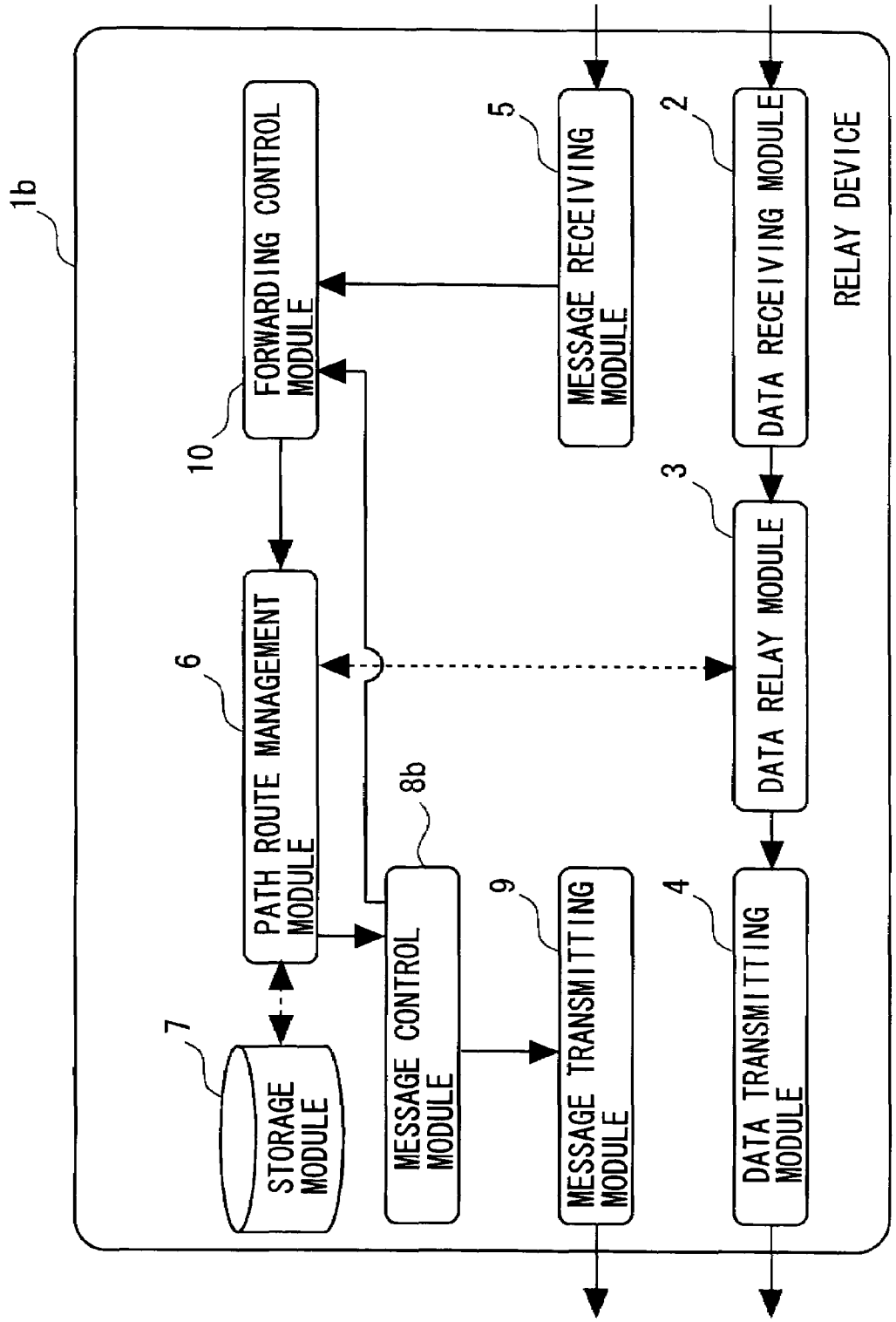
FIG. 26 is a diagram showing an example of functional blocks in a second embodiment.

FIG. 25 is a diagram showing a route trace procedure (a tenth operational example) in a case where the failure occurs in the 1+1 protection that performs asynchronous switching in the backward-direction path. In this case, the diverging node (LSR 5) in the bidirectional path forwards the data to both of the working path and the recovery path. Then, the converging node (LSR 2) in the backward direction forwards only the data received from the recovery path to the downstream node (LSR 6). This operation will hereinafter be explained in detail.

At first, the start node (LSR 6) on the backward-direction path making the request for the trace of the data forwarding route sends the Resv message to the upstream node (LSR 5). This Resv message contains the RRO stored with the address of the start node (LSR 6) that has performed the transmission. The diverging node (LSR 5) on the backward-direction path receiving this Resv message forwards the received Resv message to the upstream node (LSR 4) on the working path, and further sends a new Resv message containing the RRO stored in the received Resv message to the upstream node (LSR 8) on the recovery path. The address of the LSR 5 is added afresh to the RROs of these Resv messages.

Each of the nodes (LSR 4, LSR 3, LSR 8, LSR 7) on the respective paths, which have received the Resv message, forwards the received Resv message to the upstream node on each path. Hereat, the addresses of the respective nodes (LSR 4, LSR 3, LSR 8, LSR 7) are added afresh to the RRO of the forwarded Resv message.

The converging node (LSR 2) on the backward-direction path, the network status being the failure status, therefore sends the new Resv message containing the RRO stored in the Resv message received from the downstream node (LSR 7) on the recovery path, to the upstream node (LSR 1) on the working path. On the other hand, the converging node (LSR 2) on the backward-direction path discards the Resv message received from the downstream node (LSR 3) on the working path. The address of the converging node (LSR 2) is newly added to the RRO of the Resv message sent to the LSR 1. Then, when this Resv message reaches the LSR 1 defined as the end node on the backward-direction path, the addresses of all the nodes on the data forwarding route are stored in the RRO, thus completing the trace of the data forwarding route.

Second Embodiment

Given next are an explanation of an example of a configuration of a relay device 1b as a second embodiment of the relay device of the present invention and an explanation of an operational example of the network employing the relay device 1b of the present invention.

<Configuration of Device>

The relay device 1b is different from the relay device 1a in terms of further including a forwarding control module 10. The CPU executes a program, thereby actualizing the forwarding control module 10. Moreover, the forwarding control module 10 may also be configured as a dedicated chip.

Further, the relay device 1b is different from the relay device 1a in terms of including a message control module 8b as a substitute for the message control module 8a. Other respective functional modules of the relay device 1b have the same configurations as those of the relay device 1a. Accordingly, the following description will be focused on the message control module 8a and the forwarding control module 10, while the explanations of other functional modules are omitted.

<Message Control Module>

The message control module 8b is, in the case of receiving from an unillustrated input device an instruction of executing the route trace of the recovery path, different from the message control module 8a in terms of creating a new Path message and notifying the forwarding control module 10 of a purport of transmitting this new Path message. Further, the message control module 8b is different from the message control module 8a in terms of creating, if the forwarding control module 10 judges that the end node of the received Path message is the self-device, a Resv message corresponding to this Path message. Other operations of the message control module 8b are basically the same as those of the message control module 8a, and hence their descriptions are omitted.

<Forwarding Control Module>

The forwarding control module 10, when a new Path message is transmitted from the message transmitting module 9 of the self-device 1b, registers an unillustrated storage device with a status of waiting for receiving a Resv message corresponding to this Path message (this status will hereinafter be called [a waiting-for-message status]). The forwarding control module 10, when the message receiving module 5 receives the Resv message corresponding to the Path message, judges whether the present status is the waiting-for-message status or not. If judged to be the waiting-for-message status, the forwarding control module 10 determines that the received Resv message is not forwarded to other nodes. Then, the forwarding control module 10 notifies the path route management module 6 that the received Resv message is not forwarded to other nodes. In this case, the path route management module 6, the message control module 8a and the message transmitting module 9 do not forward the received Resv message. Then, the route trace using this Resv message is finished.

<Operational Example of Relay Device>

Figure 27:
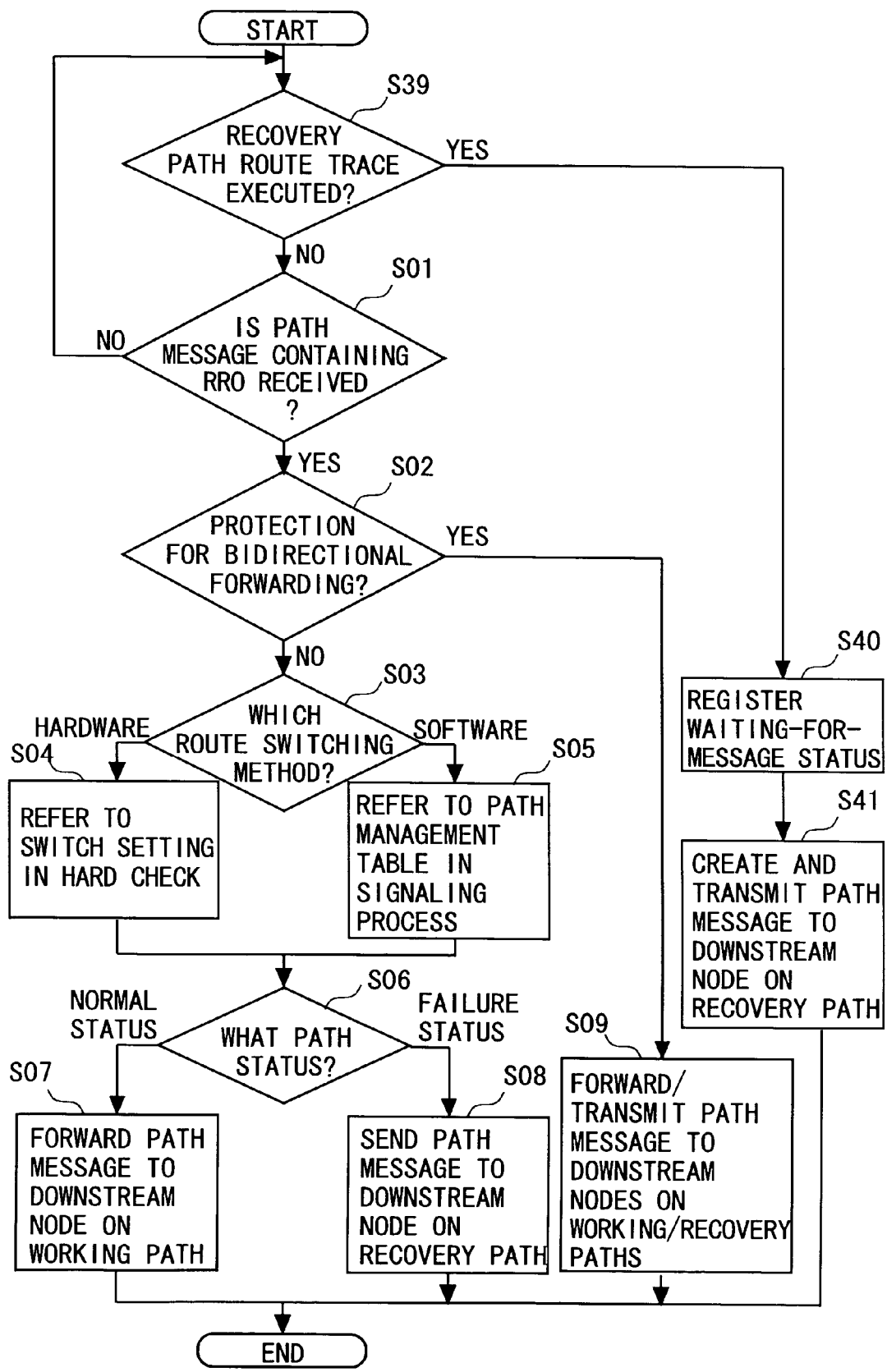
FIG. 27 is a flowchart showing an operational example of the relay device installed at the diverging point.

Next, a device operation example of the thus-configured relay device 1b will be described. FIG. 27 is a flowchart showing the example of an operation as a process for the Path message, which is executed by the relay device 1b installed as a diverging node. In this case, when the instruction of executing the route trace of the recovery path is given through the unillustrated input device (S39-YES), the forwarding control module 10 registers that the status is the waiting-for-message status (S40). The message control module 8a creates a new Path message containing the RRO. Then, the message transmitting module 9 sends this Path message to the downstream node on the recovery path (S41). Note that the processes in S40 and S41 may be reversed in order.

While on the other hand, when the instruction of executing the route trace of the recovery path is not given (S39-NO), the processes from S1 onward shown in FIG. 9 are executed.

Figure 28:
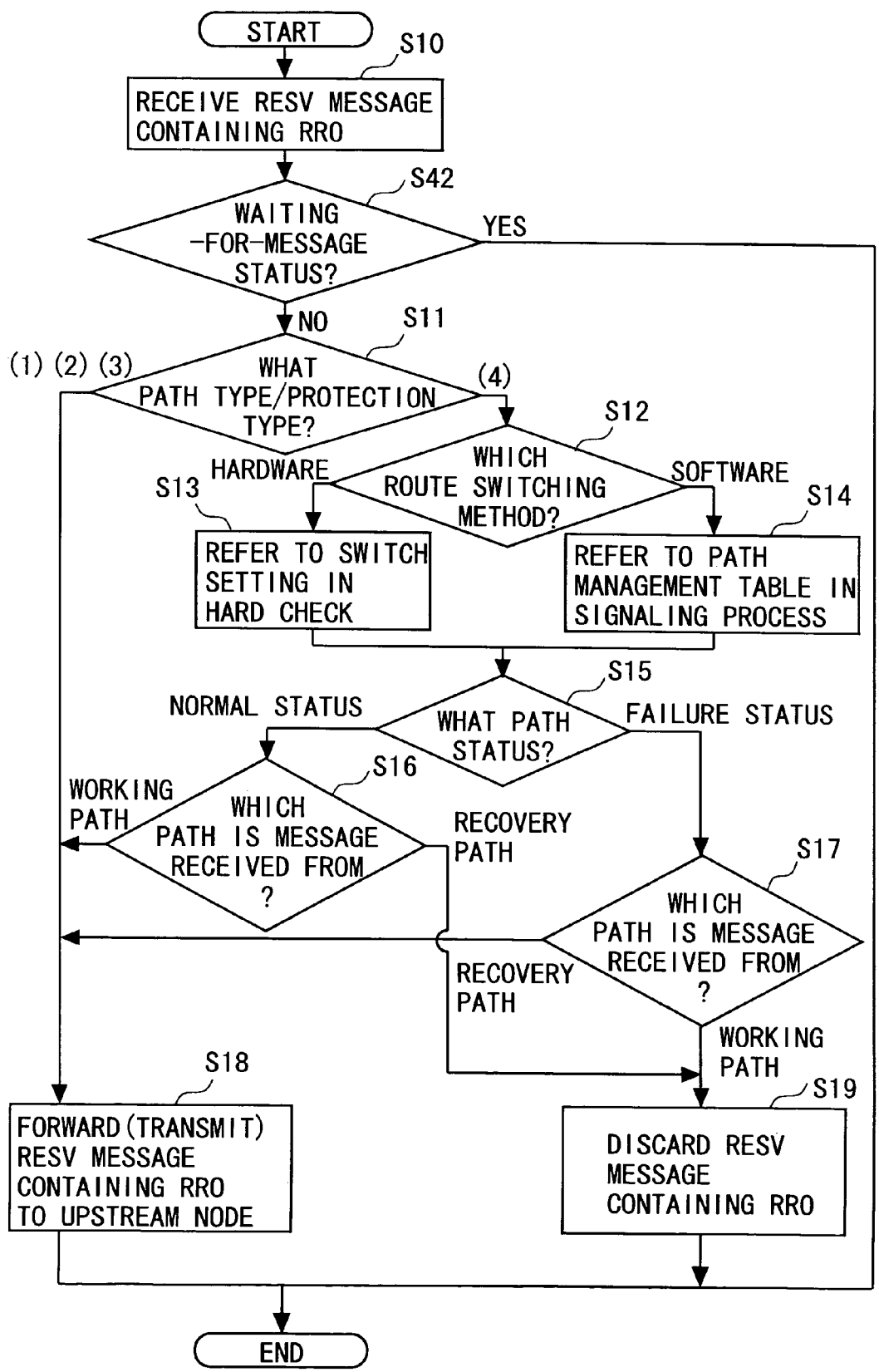
FIG. 28 is a flowchart showing an operational example of the relay device installed at the diverging point.

FIG. 28 is a flowchart showing the example of an operation as a process for the Resv message, which is executed by the relay device 1b installed as the diverging node. In this case, when receiving the Resv message containing the RRO (S10), the forwarding control module 10 checks whether in the waiting-for-message status or not. If in the waiting-for-message status (S42-YES), the forwarding control module 10 terminates the process related to the forwarding of the Resv message. Whereas if not in the waiting-for-message status (S42-NO), processes from S11 onward shown in FIG. 10 are executed.

Figure 29:
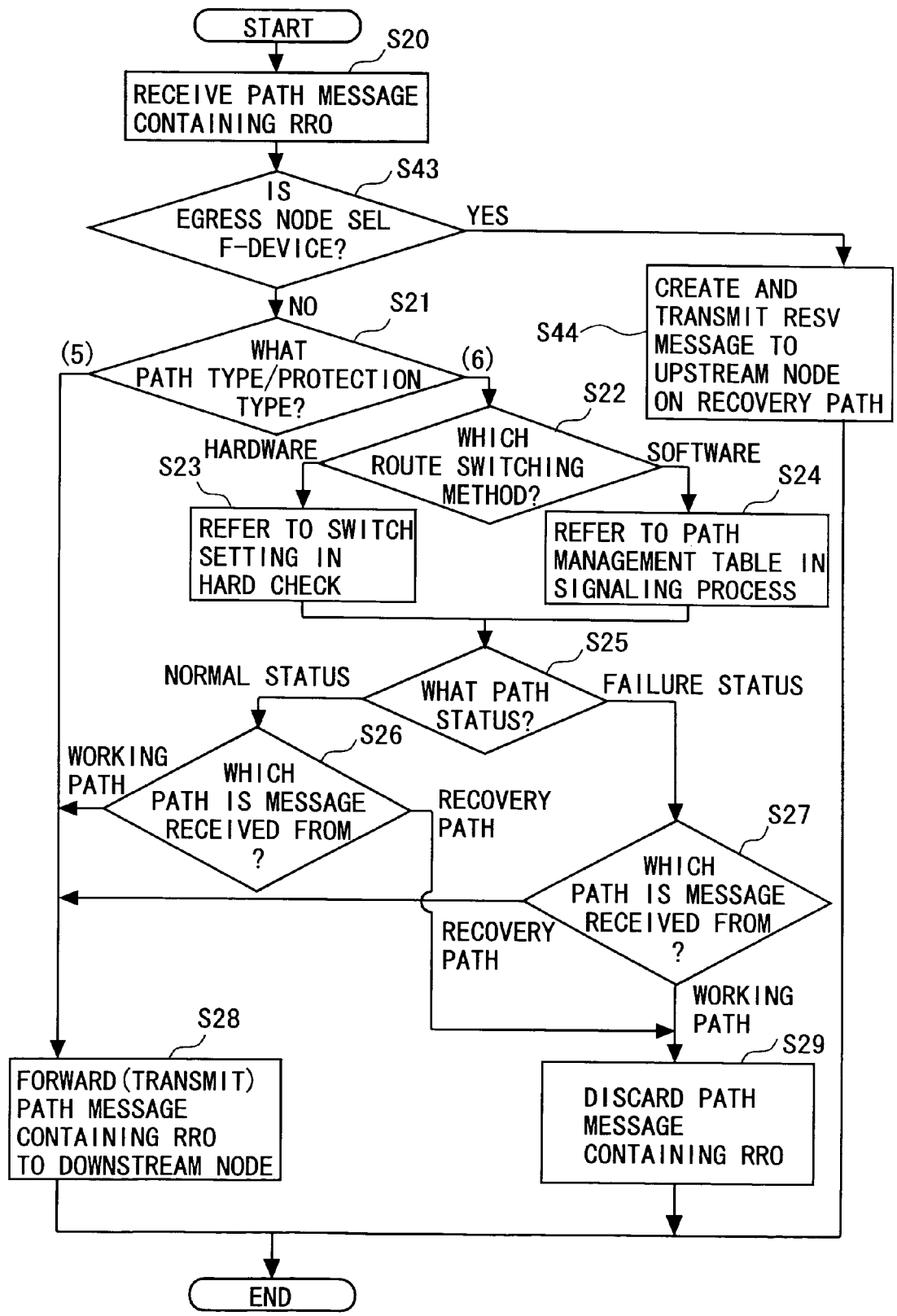
FIG. 29 is a flowchart showing an operational example of the relay device installed at the converging node.

FIG. 29 is a flowchart showing the example of an operation as a process for the Path message, which is executed by the relay device 1b installed as a converging node. In this case, when receiving the Path message containing the RRO (S20), the forwarding control module 10 judges whether the end node is the self-device or not. If the end node is the self-device (S43-YES), the message control module 8b creates the Resv message containing the RRO. Then, the message transmitting module 9 sends this Resv message to upstream node on the recovery path (S44). Whereas if the end node is not the self-device (S43-NO), processes from S21 onward shown in FIG. 11 are executed. Note that an example of the operation for the Resv message, which is performed by the relay device 1b installed as the converging node, is the same as in the flowchart shown in FIG. 12, and hence the explanation thereof is omitted.

<Eleventh Operational Example of Network>

The following is a description of an operational example of the network configured by use of the relay device 1b. Note that the present operational example of the network should essentially be explained by way of a first operational example of the network in the second embodiment, however, for preventing an explanatory confusion, the serial number of the operational example of the network in the first embodiment is used successively as a running number, wherein the present operational example of the network will be explained as an eleventh operational example.

In the network configured by employing the relay devices 1a as the diverging node and the converging node, as shown in the first through tenth operational examples of the network, the route trace throughout the nodes from the LSR 1 down to LSR 6 (or from LSR 6 down to LSR 1) is always conducted. Namely, not the route trace of the recovery path but the route trace of the data forwarding route is actualized. Accordingly, even in the case (the second, fourth, sixth, eighth, ninth and tenth operational examples) where the route trace via the recovery path is carried out, the RRO contains not only the addresses of the LSRs 2, 7, 8 and 5 building up the recovery path but also the addresses of the LSR 1 as the start node of the working path and of the LSR 6 as the end node. When trying to actualize the route trace about the recovery path, however, it is required that none of the LSRs 1 and 6 be contained in the RRO to be obtained. This being the case, the route trace about only the recovery path is actualized by installing the relay device 1b into the diverging node (LSR 2) in the network. Note that in the network operational examples given so far, each of the forwarding of the Path message and the forwarding of the Resv message has been described as an independent sequence. The following description is, however, based on the assumption that the end node receiving the Path message containing the RRO sends the Resv message corresponding to this Path message. In the network operational examples given so far, the Path message sent by the start node making the request for the route trace is received by the end node with the operation finished, and hence the start node is unable to acquire the result of the route trace. By contrast, the thus-configured network has such a merit that the start node making the request for the route trace can acquire the result of the route trace by receiving the Resv message.

In the eleventh operational example and a twelfth operational example, there will be explained the operational example of the route trace with respect to only the recovery path in the 1:1 protection network. Because of the route trace about the recovery path, the start node sending the Path message for the route trace becomes the LSR 2 defined as the diverging node. Note that the 1:1 protection will be again briefly described. In the 1:1 protection, the diverging node (LSR 2) forwards the data to the working path in the case of the normal status, and forwards the data to the recovery path in the case of the failure status. On the other hand, the converging node (LSR 5) forwards the data received from the working path in the case of the normal status, and forwards the data received from the recovery path in the case of the failure status.

Figure 30:
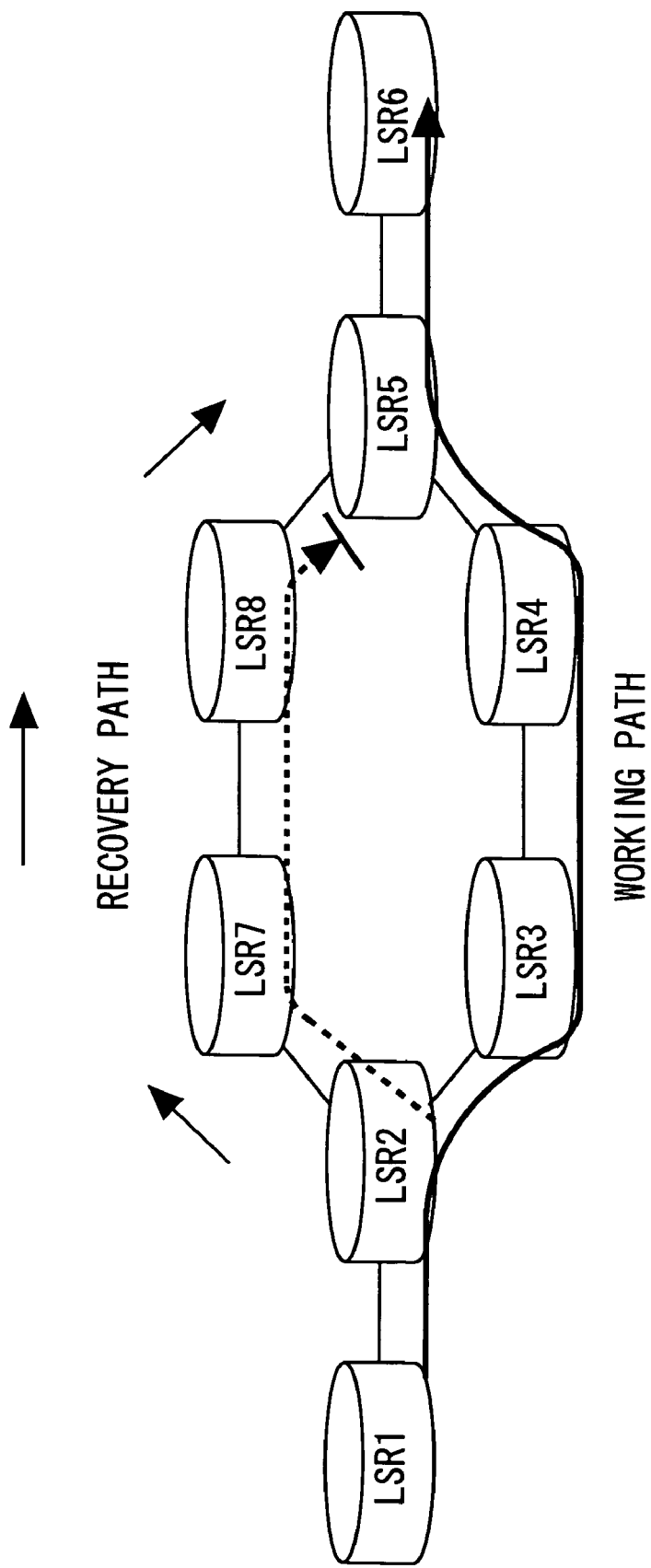
FIG. 30 is a diagram showing a flow of the Path message in an eleventh operational example of the network.

FIG. 30 is a diagram showing a flow of the Path message in the route trace of the recovery path in the normal status. The start node (LSR 2) on the recovery path creates the Path message and sends the message to the downstream node (LSR 7) on the recovery path. This Path message contains the RRO stored with the address of the LSR 2 as the start node. Each of the nodes (LSR 7, LSR 8) on the recovery path, which have received this Path message, forwards the received Path message to the downstream node.

Figure 31:
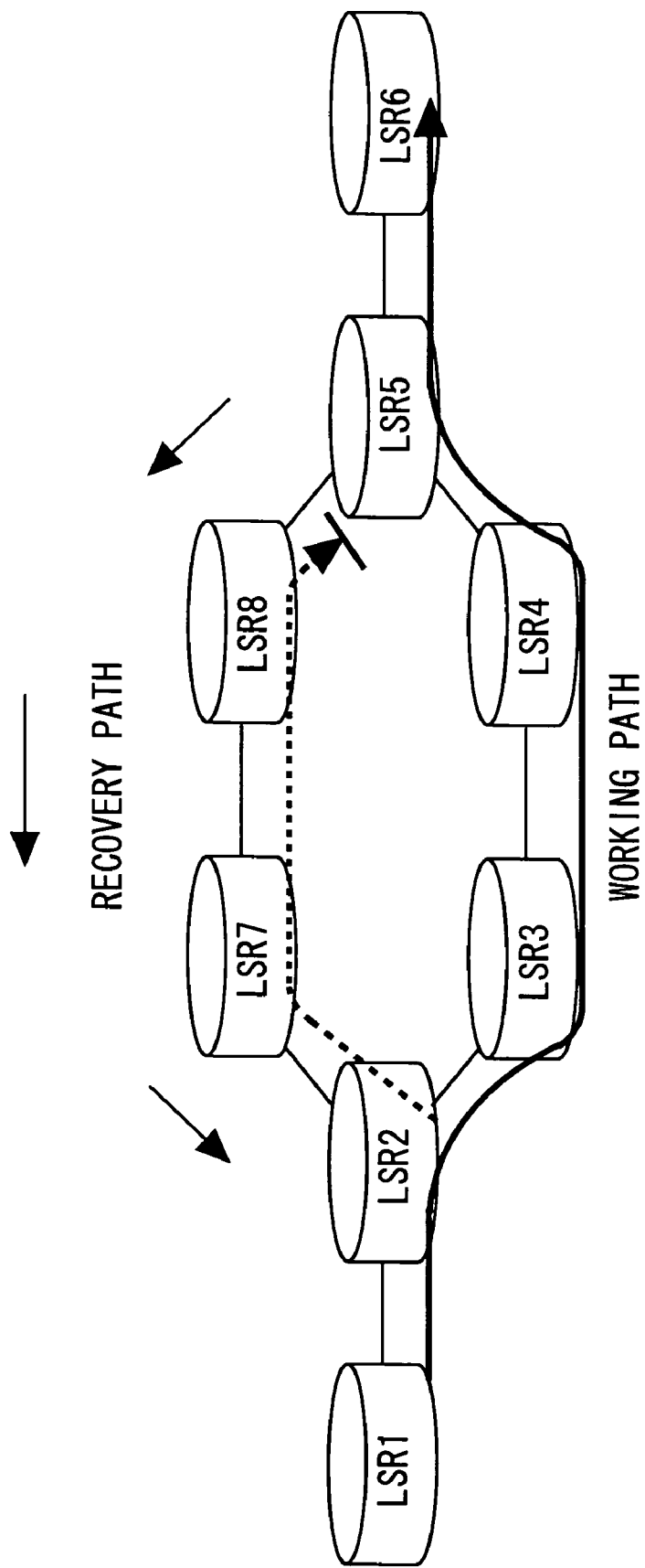
FIG. 31 is a diagram showing a flow of a Resv message in the eleventh operational example of the network.

The network status is the normal status, and hence, normally, the converging node (LSR 5) does not forward the Path message received from the upstream node (LSR 8) on the recovery path. The converging node (LSR 5) is, however, the end node of the recovery path and therefore becomes the end node of the Path message for the route trace of the recovery path. Accordingly, the converging node (LSR 5) creates the Resv message corresponding to the received Path message, and sends the Resv message back to the upstream node on the recovery path (see FIG. 31). FIG. 31 is a diagram showing a flow of the Resv message in the route trace of the recovery path in the normal status. Each of the recovery path nodes (LSR 8, LSR 7) receiving the Resv message forwards the Resv message to the upstream node on the recovery path. Addresses of the respective nodes are newly added to the RRO of this Resv message.

When the start node (LSR 2) on the recovery path receives the Resv message forwarded via the recovery path, the waiting status management module 10 confirms that the status is the waiting-for-message status, and stops forwarding this Resv message. Then, the route trace of the recovery path is completed. At this time, the RRO of the Resv message received by the LSR 2 defined as the start node of the recovery path is stored with the addresses of all the nodes on the recovery path.

<Twelfth Operational Example of Network>

The route trace of the recovery path in the failure status may be actualized by use of the relay device 1b configured as described above, and may also be actualized by employing a relay device 1c as a modified example of the relay device 1b. At first, for simplifying the explanation, the operational example (the twelfth operational example) of the network configured by using the relay device 1c will be explained in advance of a configurational example of the relay device 1c.

Figure 32:
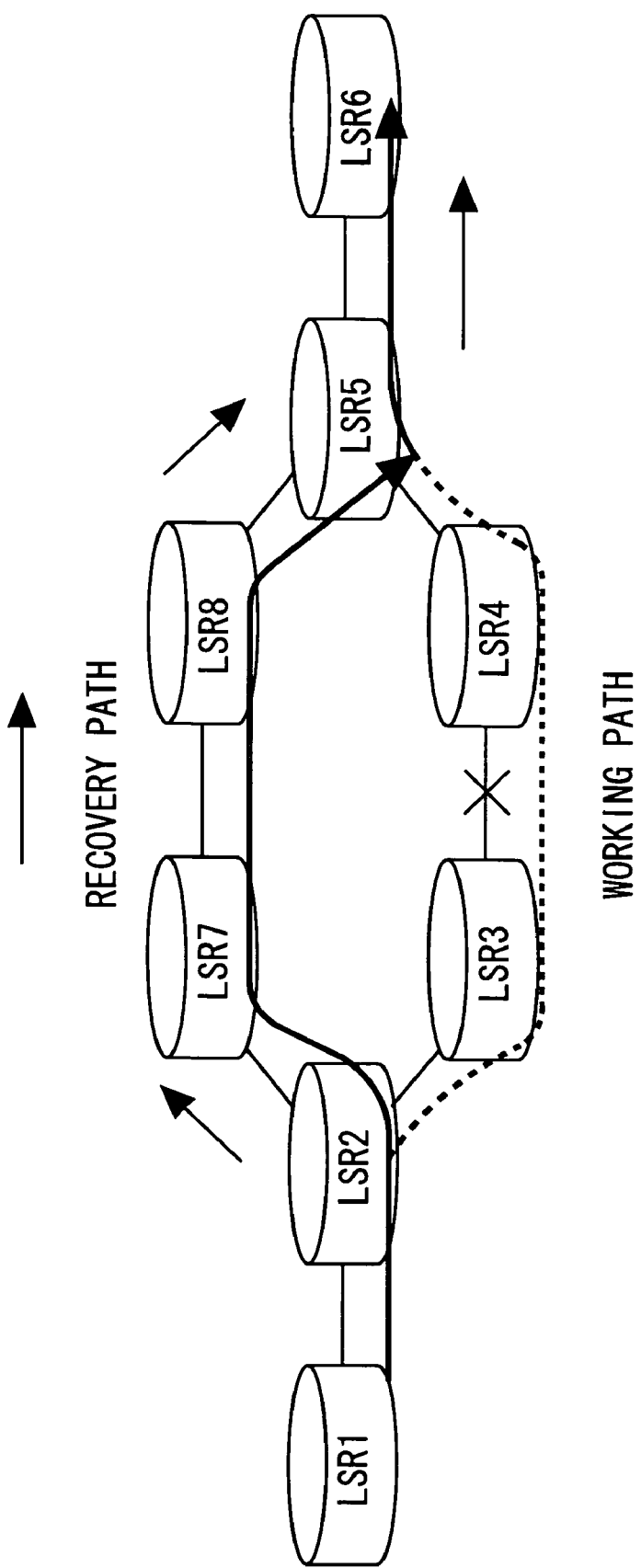
FIG. 32 is a diagram showing a flow of the Path message in a twelfth operational example of the network.
Figure 33:
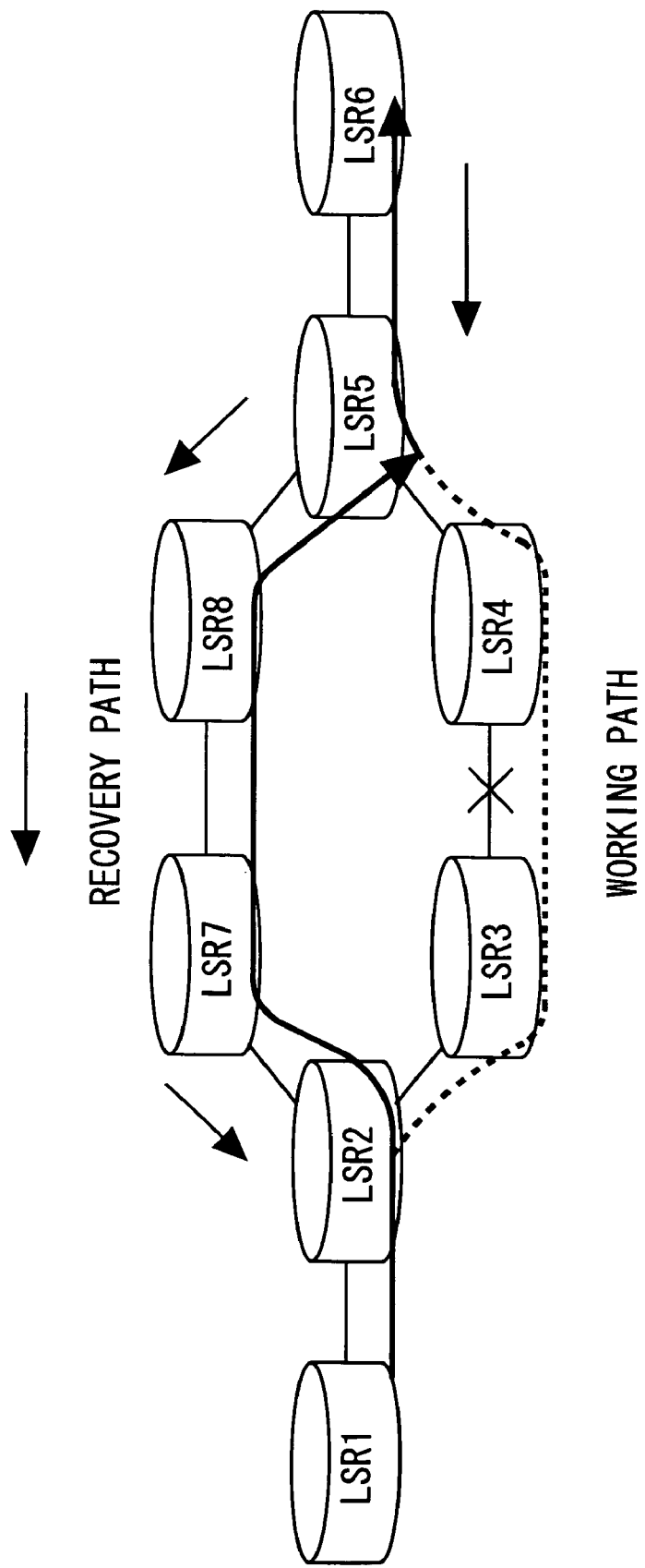
FIG. 33 is a diagram showing a flow of the Resv message in the twelfth operational example of the network.

FIG. 32 is a diagram showing a flow of the Path message in the route trace of the recovery path in the failure status. Further, FIG. 33 is a diagram showing a flow of the Resv message in the route trace of the recovery path in the failure status. The relay device 1c is applied to the converging node (LSR 5) in this network.

As shown in the description made so far, if the network is in the failure status, the converging node (LSR 5) transmits, to the downstream node (LSR 6) on the working path, a new Path message stored with the RRO contained in the Path message received from the upstream node (LSR 8) on the recovery path. Therefore, the Path message hops over the recovery path (over the LSR 5 serving as the end node) that becomes an object of the route trace, and reaches the end node (LSR 6) of the data forwarding path. Then, the LSR 6 as the end node of the data forwarding path, when receiving the Path message, sends the Resv message back.

This Resv message reaches the start node (LSR 2) of the recovery path again via the converging node (LSR 5) and the recovery path. At this time, the Resv message received by the start node (LSR 2) contains an address of the start node (LSR 6) on the data forwarding path and addresses of the respective nodes (LSR 5, LSR 8, LSR 7) on the recovery path. The start node (LSR 2) on the recovery path deletes, among these addresses, the address of the node that hops over the end node (LSR 5) on the recovery path. By this process, the start node (LSR 2) on the recovery path acquires the addresses of the respective nodes included in the recovery path as a result of the route trace of the recovery path.

<Modified Example>

Figure 34:
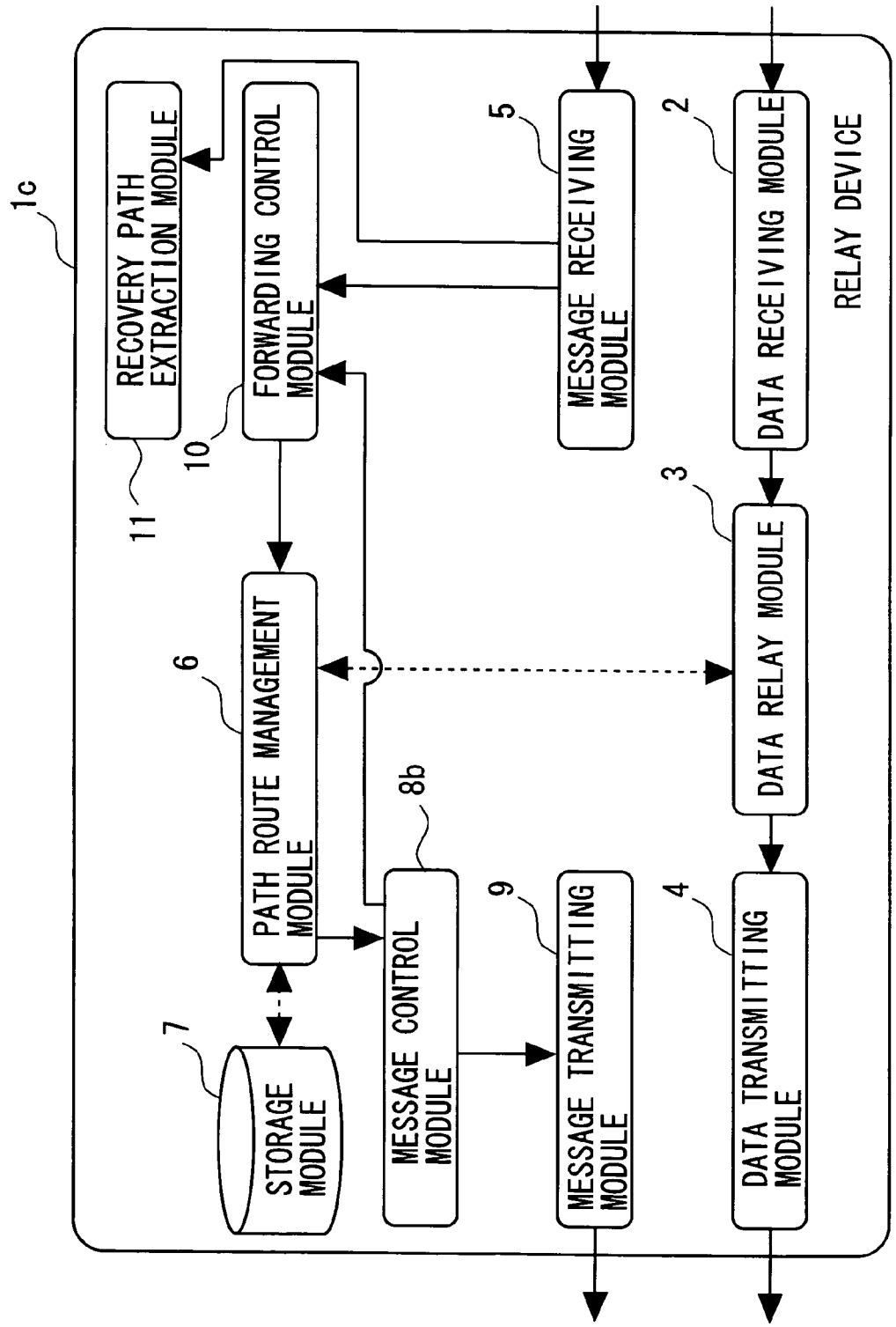
FIG. 34 is a diagram showing functional blocks in a modified example of the relay device.

FIG. 34 shows the relay device 1c as a modified example of the relay device 1b. The relay device 1c is different from the relay device 1b in terms of including a recovery path extraction module 11. The CPU executes a program, thereby actualizing the recovery path extraction module 11. Moreover, the recovery path extraction module 11 may also be configured as a dedicated chip.

The recovery path extraction module 11, when the Resv message is received and when the start node of the received Resv message is the self-device, reads addresses of the respective nodes that are contained in the RRO of this Resv message. Next, the recovery path extraction module 11 detects, among (the addresses of) the respective nodes that are contained in sequence in the RRO, the address of the start node on the recovery path. Then, the recovery path extraction module 11 deletes the addresses recorded in the RRO anterior to the detected address, and extracts the remaining addresses as a result of the route trace of the recovery path. The address of the start node on the recovery path may be judged in a way that refers to, e.g., a path ID (the path ID specifying the recovery path) contained in the Resv message, the address (the address of the end node on the recovery path) of the end node, and so on. Moreover, when the Path message is sent, any one of the functional modules of the relay device 1b stores the path ID (the path ID specifying the recovery path) contained in the Path message, the address (the address of the end node on the recovery path) of the end node, etc., whereby the address of the end node on the recovery path may be judged.

Further, the route trace of the recovery path in the failure status may be actualized as follows. To start with, the start node (LSR 2) on the recovery path that makes the request for the route trace of the recovery path adds a flag indicating the route trace of the recovery path to the Path message to be sent. The converging node (LSR 5), in the case of receiving the flag-added Path message, judges that it is the route trace of the recovery path irrespective of whether the network is in the normal status or in the failure status. Then, the converging node (LSR 5) sends back the Resv message corresponding to the Path message without forwarding the received Path message to the downstream node (LSR 6) on the working path. In this case, the message control module 8b sets a flag indicating the route trace of the recovery path on the occasion of creating the Path message for performing the route trace of the recovery path.

Note that the operation of the route trace of the recovery path basically remains unchanged whether in the 1:1 protection network or in the 1+1 protection network because of the path ID of the recovery path being designated beforehand. Therefore, the start node (LSR 2) on the recovery path and/or the end node (LSR 5) on the recovery path are or is applied to the network, whereby the route trace of the recovery path can be actualized in any type of protection.

Further, the description given above has exemplified the example in which the relay devices 1a, 1b and 1c are so configured as to be flexible to the plurality of network modes, however, the relay device may also be so configured as to operate in a way that specializes in any one of the diverging node, the converging node, the start node on the recovery path and the end node on the recovery path in the first through twelfth operational examples of the network.

The present invention may be specified as follows.

(Note 1) A relay device in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay device comprising:

a receiving unit receiving a message used for detecting each of the nodes on the path;

a path determining unit determining the path used for transferring data at the present in the path specified by the path identifiers included in the message and the path corresponding to the path specified by the path identifier;

an identifier adding unit adding an identifier specifying a self-device to information contained in the message received by the receiving unit; and a transmitting unit transferring the information with the self-device identifier to the determined path.

(Note 2) A relay device in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay device comprising:
a receiving unit receiving a message;
an identifier adding unit adding an identifier specifying a self-device to information contained in the message received by the receiving unit; and
a transmitting unit transferring the information contained in the received message irrespective of whether the received message is received from the working path or from the recovery path.

(Note 3) A route trace system in a network including paths each extending from a start node to an end node, each of the paths having path identifiers each uniquely specifying the path, and the paths including a working path and a recovery path of the working path, the route trace system comprising:
a first relay device being installed in a parting within the network in order to detect each of the nodes on the path without depending on the path identifier, the first relay device including:
a receiving unit receiving a message used for detecting each of the nodes on the path;
a path determining unit determining the path used for transferring data at the present in the path specified by the path identifiers included in the message and the path corresponding to the path specified by the path identifier;
an identifier adding unit adding an identifier specifying a self-device to information contained in the message received by the receiving unit; and
a transmitting unit transferring the information with the self-device identifier to the determined path; and
a second relay device installed in a parting within the network, the second relay device including:
a receiving unit receiving the message;
a identifier adding unit adding an identifier specifying a self-device to information contained in the message received by the receiving unit; and
a transmitting unit transferring the information contained in the received message irrespective of whether the received message is received from the working path or from the recovery path.

(Note 4) A relay device in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay device comprising:
a receiving unit receiving a message used for detecting each of the nodes on the path;
a path determining unit determining the path used for transferring data at the present in the path specified by the path identifier included in the message and the path corresponding to the path specified by the path identifier, and determining to transfer, when the determined path is coincident with the path that has been used to receive the message information contained in the message to the determined path;
an identifier adding unit adding an identifier specifying a self-device to the information contained in the message; and
a transmitting unit transferring the information with the self-device identifier to the determined path.

(Note 5) A relay device in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay device comprising:
a receiving unit receiving a message used for detecting each of the nodes on the path;
an identifier adding unit adding an identifier specifying a self-device to information contained in the message received by the receiving unit; and
a transmitting unit transferring the information contained in the message received by the receiving unit to both of the working path and the recovery path irrespective of whether a network status is a normal status or a failure status.

(Note 6) A route trace system in a network including paths each extending from a start node to an end node, each of the paths having path identifiers each uniquely specifying the path, and the paths including a working path and a recovery path of the working path, the route trace system comprising:
a first relay device being installed in a parting within the network in order to detect each of the nodes on the path without depending on the path identifier, the first relay device including:
a receiving unit receiving a message used for detecting each of the nodes on the path;
an identifier adding unit adding an identifier specifying a self-device to information contained in the message received by the receiving unit; and
a transmitting unit transferring the information contained in the message received by the receiving unit to both of the working path and the recovery path irrespective of whether a network status is a normal status or a failure status; and
a second relay device installed in a parting within the network, the second relay device including:
a receiving unit receiving a message;
a path determining unit determining the path used for transferring data at the present in the path specified by the path identifier included in the message and the path corresponding to the path specified by the path identifier, and determining to transfer, when the determined path is coincident with the path that has been used to receive the message information contained in the message to the determined path;
an identifier adding unit adding an identifier specifying a self-device to the information contained in the message; and
a transmitting unit transferring the information with the self-device identifier to the determined path.

(Note 7) A relay device in a network where paths each extending from a start node to an end node, and the paths include a working path and a recovery path of the working path, the relay device being installed in the start node on the recovery path in order to detect each of the nodes included in the recovery path, the relay device comprising:
a transmitting unit transmitting, to the recovery path, a message used for detecting each of nodes on the recovery path;

a receiving unit receiving a message returned from a relay device with respect to the message transmitted by the transmitting unit; and a determining unit storing that a self-device is in a waiting-for-message status when the transmitting unit transmits the message, and determining not to transfer the returned message to the other relay device if the waiting-for-message status is stored when receiving the returned message.

(Note 8) A relay device in a network where paths each extending from a start node to an end node, and the paths include a working path and a recovery path of the working path, the relay device being installed in the start node on the recovery path in order to detect each of the nodes included in the recovery path, the relay device comprising:

a transmitting unit transmitting, to the recovery path, a message used for detecting each of nodes on the recovery path;

a receiving unit receiving a message returned from a relay device with respect to the message transmitted by the transmitting unit, the returned message containing an identifier of the other relay device and identifiers of respective relay devices included in the recovery path between the other relay device and the relay device itself;

a determining unit determining an end node on the recovery path; and a detecting unit detecting the identifiers of the respective relay devices included in the recovery path by eliminating the identifiers of the respective relay devices end following after the end node from the identifiers of the respective relay devices in the returned message.

(Note 9) A relay method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay method comprising:

a step of the relay device's receiving a message used for detecting each of the nodes on the path;

a step of the relay device's determining the path used for transferring data at the present in the path specified by the path identifiers included in the message and the path corresponding to the path specified by the path identifier;

a step of the relay device's adding an identifier specifying a self-device to information contained in the received message; and a step of the relay device's transferring the information with the self-device identifier to the determined path.

(Note 10) A relay method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay method comprising:

a step of the relay device's receiving a message;

a step of the relay device's adding an identifier specifying a self-device to information contained in the received message; and a step of the relay device's transferring the information contained in the received message irrespective of whether the received message is received from the working path or from the recovery path.

(Note 11) A route trace method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the route trace method comprising:

a step of the first relay device's receiving a message used for detecting each of the nodes on the path;

a step of the first relay device's determining the path used for transferring data at the present in the path specified by the path identifiers included in the message and the path corresponding to the path specified by the path identifier;

a step of the first relay device's adding an identifier specifying a self-device to information contained in the received message; and a step of the first relay device's transferring the information contained in the received message to the judged path, the route trace method, a second relay device being installed at a diverging node within the network, further comprising:

a step of the second relay device's receiving a message; a step of the second relay device's adding an identifier specifying a self-device to information contained in the received message; and a step of the second relay device's transferring the information contained in the message irrespective of whether the received message is received from the working path or from the recovery path.

(Note 12) A relay method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay method comprising:

a step of the relay device's receiving a message used for detecting each of the nodes on the path;

a step of the relay device's determining the path used for transferring data at the present in the path specified by the path identifier included in the message and the path corresponding to the path specified by the path identifier, and determining to transfer, when the determined path is coincident with the path that has been used to receive the message information contained in the message to the determined path;

a step of the relay device's adding an identifier specifying a self-device to the information contained in the message; and a step of the relay device's transferring the information with the self-device identifier to the determined path.

(Note 13) A relay method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the relay method comprising:

a step of the relay device's receiving a message used for detecting each of the nodes on the path;

a step of the relay device's adding an identifier specifying a self-device to information contained in the received message; and a step of the relay device's transferring the information contained in the received to both of the working path and the recovery path irrespective of whether a network status is a normal status or a failure status.

(Note 14) A route trace method in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the route trace method comprising:

a step of the first relay device's receiving a message used for detecting each of the nodes on the path;

a step of the first relay device's adding an identifier specifying a self-device to information contained in the received message; and a step of the first relay device' transferring the information contained in the received message to both of the working path and the recovery path irrespective of whether a network status is a normal status or a failure status, the route trace method, a second relay device being installed in a parting within the network, further comprising:

a step of the second relay device' receiving the message;

a step of the second relay device' determining the path used for transferring data at the present in the path specified by the path identifier included in the message and the path corresponding to the path specified by the path identifier, and determining to transfer, when the determined path is coincident with the path that has been used to receive the message information contained in the message to the determined path;

a step of the second relay device' adding an identifier specifying a self-device to the information contained in the message; and a step of the second relay device' transferring the information with the self-device identifier to the determined path.

(Note 15) A relay method in a network where paths each extending from a start node to an end node, and the paths include a working path and a recovery path of the working path, the relay device being installed in the start node on the recovery path in order to detect each of the nodes included in the recovery path, the relay method comprising:

a step of the relay device's transmitting, to the recovery path, a message used for detecting each of nodes on the recovery path;

a step of the relay device's receiving a message returned from a relay device with respect to the message transmitted; and a step of the relay device's storing that a self-device is in a waiting-for-message status when the transmitting the message, and determining not to transfer the returned message to the other relay device if the waiting-for-message status is stored when receiving the returned message.

(Note 16) A relay method in a network where paths each extending from a start node to an end node, and the paths include a working path and a recovery path of the working path, the relay device being installed in the start node on the recovery path in order to detect each of the nodes included in the recovery path, the relay method comprising:

a step of the relay device's transmitting, to the recovery path, a message used for detecting each of nodes on the recovery path;

a step of the relay device's receiving a message returned from a relay device with respect to the transmitted message, the returned message containing an identifier of the other relay device and identifiers of respective relay devices included in the recovery path between the other relay device and the relay device itself;

a step of the relay device's determining an end node on the recovery path; and a step of the relay device's detecting the identifiers of the respective relay devices included in the recovery path by eliminating the identifiers of the respective relay devices end following after the end node from the identifiers of the respective relay devices in the returned message.

(Note 17) A computer readable storage medium storing a program in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the program making the relay device execute:

a step of receiving a message used for detecting each of the nodes on the path;

a step of determining the path used for transferring data at the present in the path specified by the path identifiers included in the message and the path corresponding to the path specified by the path identifier;

a step of adding an identifier specifying a self-device to information contained in the received; and a step of transferring the information with the self-device identifier to the determined path.

(Note 18) A computer readable storage medium storing a program in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the program making the relay device execute:

a step of receiving a message;

a step of adding an identifier specifying a self-device to information contained in the received message; and a step of transferring the information contained in the received message irrespective of whether the received message is received from the working path or from the recovery path.

(Note 19) A computer readable storage medium storing a program in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the program making the relay device execute:

a step of receiving a message used for detecting each of the nodes on the path;

a step of determining the path used for transferring data at the present in the path specified by the path identifier included in the message and the path corresponding to the path specified by the path identifier, and determining to transfer, when the determined path is coincident with the path that has been used to receive the message information contained in the message to the determined path;

a step of adding an identifier specifying a self-device to the information contained in the message; and a step of transferring the information with the self-device identifier to the determined path.

(Note 20) A computer readable storage medium storing a program in a network including paths each extending from a start node to an end node, each of the paths having path identifiers each uniquely specifying the path, and the paths including a working path and a recovery path of the working path, the relay device being installed in a parting within the network in order to detect each of the nodes on the path without depending on the path identifier, the program making the relay device execute:

a step of receiving a message used for detecting each of the nodes on the path;

a step of adding an identifier specifying a self-device to information contained in the received message; and a step of transferring the information contained in the received message to both of the working path and the recovery path irrespective of whether a network status is a normal status or a failure status.

(Note 21) A computer readable storage medium storing a program in a network where paths each extending from a start node to an end node, and the paths include a working path and a recovery path of the working path, the relay device being installed in the start node on the recovery path in order to detect each of the nodes included in the recovery path, the program making the relay device execute:

a step of the transmitting, to the recovery path, a message used for detecting each of nodes on the recovery path;

a step of receiving a message returned from a relay device with respect to the message transmitted; and a step of storing that a self-device is in a waiting-for-message status when the transmitting the message, and determining not to transfer the returned message to the other relay device if the waiting-for-message status is stored when receiving the returned message.

(Note 22) A computer readable storage medium storing a program in a network where paths each extending from a start node to an end node, and the paths include a working path and a recovery path of the working path, the relay device being installed in the start node on the recovery path in order to detect each of the nodes included in the recovery path, the program making the relay device execute:

a step of transmitting, to the recovery path, a message used for detecting each of nodes on the recovery path;

a step of receiving a message returned from a relay device with respect to the message, the returned message containing an identifier of the other relay device and identifiers of respective relay devices included in the recovery path between the other relay device and the relay device itself;

a step of determining an end node on the recovery path; and a step of detecting the identifiers of the respective relay devices included in the recovery path by eliminating the identifiers of the respective relay devices following after the end node from the identifiers of the respective relay devices in the returned message.

<Others>

The disclosures of Japanese patent application No. JP2005-60916 filed on Mar. 4, 2005 including the specification, drawings and abstract are incorporated herein by reference.

What is claimed is:

1. A relay device in a network including paths each extending from a start node to an end node, each of the paths having a path identifier uniquely specifying the path, the relay device being installed in a parting within the network in order to detect each of the nodes on the path without depending on the path identifier, the relay device comprising:

a receiving unit to receive a message used for detecting each of the nodes on the path;

a path determining unit to determine a path presently being used for transferring data between a working path specified by the path identifier included in the message and a recovery path of the working path;

an address adding unit to add an address assigned to the relay device to information contained in the message received by the receiving unit, the information including an address assigned to another relay device that has relayed the message; and a transmitting unit to transmit the message including the information with the address assigned to the relay device and the address assigned to the another relay device that has relayed the message to the determined path.

2. The relay device according to claim 1, wherein the message transmitted by the relay device is received by another relay device being installed in a confluence within the network, the information contained in the message received by the another relay device being installed in the confluence within the network includes the address assigned to the relay device and the address assigned to the another relay device that has relayed the message, the another relay device being installed in the confluence within the network adds an address assigned to the another relay device being installed in the confluence within the network, to the information contained in the message received from the relay device, and, the another relay device being installed in the confluence within the network transmits the message including the information with the relay device address, the address assigned to the another relay device that has relayed the message and the address assigned to the another relay device being installed in the confluence within the network.

3. A relay device in a network including paths each extending from a start node to an end node, each of the paths having a path identifier uniquely specifying the path, and the paths including a working path and a recovery path of the working path, the relay device being installed in a confluence within the network in order to detect each of the nodes on the path without depending on the path identifier, the relay device comprising:

a receiving unit to receive a message used for detecting each of the nodes on the path;

an address adding unit to add an address assigned to the relay device to information contained in the message received by the receiving unit, the information including an address assigned to another relay device that has relayed the message; and a transmitting unit to transmit the message including the information with the address assigned to the relay device and the address assigned to the another relay device that has relayed the message irrespective of whether the received message is received from the working path or from the recovery path.

4. The relay device according to claim 3, wherein the information contained in the message received by the receiving unit includes an address assigned to another relay device being installed in a parting within the network and the address assigned to the another relay device that have relayed the message, the another relay device being installed in the parting within the network adds an address assigned to the another relay device being installed in the parting within the network, to the information contained in the message, the another relay device being installed in the parting within the network transmits the message including the information with the address assigned to the another relay device being installed in the parting within the network.

5. A relay device in a network including paths each extending from a start node to an end node, each of the paths having a path identifier uniquely specifying the path, the relay device being installed in a confluence within the network in order to detect each of the nodes on the path without depending on the path identifier, the relay device comprising:

a receiving unit to receive a message used for detecting each of the nodes on the path;

a path determining unit to determine a path presently being used for transferring data between a working path specified by the path identifier included in the message and a recovery path of the working path, and to determine to transfer, when the determined path is coincident with the path that has been used to receive the message, the message to the determined path;

an address adding unit to add an address assigned to the relay device to the information contained in the message received by the receiving unit, the information including an address assigned to another relay device that has relayed the message; and a transmitting unit to transmit the message including the information with the address assigned to the relay device and the addresses assigned to the another relay device that has relayed the message to the determined path.

6. The relay device according to claim 5, wherein the information contained in the message received by the receiving unit includes an address assigned to another relay device being installed in a parting within the network and the address assigned to the another relay device that have relayed the message, the another relay device being installed in the parting within the network adds an address assigned to the another relay device being installed in the parting within the network, to the information contained in the message, the another relay device being installed in the parting within the network transmits the message including the information with the address assigned to the another relay device being installed in the parting within the network.

7. A relay device in a network including paths each extending from a start node to an end node, each of the paths having a path identifier uniquely specifying the path, and the paths including a working path and a recovery path of the working path, the relay device being installed in a parting within the network in order to detect each of the nodes on the path without depending on the path identifier, the relay device comprising:

a receiving unit to receive a message used for detecting each of the nodes on the path;

an address adding unit to add an address assigned to the relay device to information contained in the message received by the receiving unit, the information including an address assigned to another relay device that has relayed the message; and a transmitting unit to transmit the message including the information with the address assigned to the relay device and the address assigned to the another relay device that has relayed the message to both of the working path and the recovery path irrespective of whether a network status is a normal status or a failure status.

8. The relay device according to claim 7, wherein the message transmitted by the relay device is received by another relay device being installed in a confluence within the network, the information contained in the message received by the another relay device being installed in the confluence within the network includes the address assigned to the relay device and the address assigned to the another relay device that has relayed the message, the another relay device being installed in the confluence within the network adds an address assigned to the another relay device being installed in the confluence within the network, to the information contained in the message received from the relay device, and, the another relay device being installed in the confluence within the network transmits the message including the information with the relay device address, the address assigned to the another relay device that has relayed the message and the address assigned to the another relay device being installed in the confluence within the network.

9. A relay device in a network where paths each extending from a start node to an end node, and the paths include a working path and a recovery path of the working path, the relay device being installed in the start node on the recovery path in order to detect each of the nodes included in the recovery path, the relay device comprising:

a creating unit to create a message used for detecting each of nodes on the recovery path, the message containing an address assigned to the relay device;

a transmitting unit to transmit the message to the recovery path;

a receiving unit to receive, through the recovery path, a message returned from another relay device with respect to the message transmitted by the transmitting unit, the returned message containing addresses assigned to each of nodes on the recovery path; and a determining unit to store that a self-device is in a waiting-for-message status when the transmitting unit transmits the message, and to determine not to transfer the returned message if the waiting-for-message status is stored when receiving the returned message.

10. A relay device in a network where paths each extending from a start node to an end node, and the paths include a working path and a recovery path of the working path, the relay device being installed in the start node on the recovery path in order to detect each of the nodes included in the recovery path, the relay device comprising:

a creating unit to create a message used for detecting each of nodes on the recovery path, the message containing an address assigned to the relay device;

a transmitting unit to transmit the message to the recovery path;

a receiving unit to receive, through the recovery path, a message returned from another relay device with respect to the message transmitted by the transmitting unit, the returned message containing an address assigned to the another relay device and addresses assigned to respective nodes on the recovery path between the another relay device and the relay device itself;

a determining unit to determine an end node on the recovery path; and a detecting unit to detect the addresses assigned to the respective nodes on the recovery path by eliminating the addresses assigned to the respective nodes following after the end node from the addresses assigned to the respective nodes in the returned message.

* * * * *